(12) United States Patent
Cantrell et al.

(10) Patent No.: US 10,423,169 B2
(45) Date of Patent: Sep. 24, 2019

(54) GEOGRAPHIC AREA MONITORING SYSTEMS AND METHODS UTILIZING COMPUTATIONAL SHARING ACROSS MULTIPLE UNMANNED VEHICLES

(71) Applicant: Walmart Apollo, LLC, Bentonville, AR (US)

(72) Inventors: Robert L. Cantrell, Herndon, VA (US); John P. Thompson, Bentonville, AR (US); David C. Winkle, Bella Vista, AR (US); Michael D. Atchley, Springdale, AR (US); Donald R. High, Noel, MO (US); Todd D. Mattingly, Bentonville, AR (US); Brian G. McHale, Chadderton Oldham (GB); John J. O'Brien, Farmington, AR (US); John F. Simon, Pembroke Pines, FL (US); Nathan G. Jones, Bentonville, AR (US); Robert C. Taylor, Charlotte, NC (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 15/699,936

(22) Filed: Sep. 8, 2017

(65) Prior Publication Data
US 2018/0074522 A1    Mar. 15, 2018

Related U.S. Application Data

(60) Provisional application No. 62/385,381, filed on Sep. 9, 2016.

(51) Int. Cl.
*G05D 1/00* (2006.01)
*G05D 1/10* (2006.01)
(Continued)

(52) U.S. Cl.
CPC .......... *G05D 1/104* (2013.01); *B64C 39/024* (2013.01); *B64D 1/22* (2013.01); *G05D 1/0027* (2013.01);
(Continued)

(58) Field of Classification Search
None
See application file for complete search history.

(56) References Cited

U.S. PATENT DOCUMENTS

| 5,575,438 A | 11/1996 | McGonigle |
| 5,779,190 A | 7/1998 | Rambo |

(Continued)

FOREIGN PATENT DOCUMENTS

| EP | 2003057 B1 | 12/2008 |
| WO | 2016134193 A1 | 8/2016 |

OTHER PUBLICATIONS

PCT; App. No. PCT/US2017/050664; International Search Report and Written Opinion dated Dec. 20, 2017.

(Continued)

*Primary Examiner* — Jonathan M Dager
(74) *Attorney, Agent, or Firm* — Fitch, Even, Tabin & Flannery LLP

(57) ABSTRACT

In some embodiments, unmanned aerial task systems are provided that comprise: multiple unmanned aerial vehicles (UAV) each comprising: a UAV control circuit; a motor; and a propulsion system; and wherein data acquired through a first set of at least one of the multiple UAVs while performing a first set of at least one task is caused to be distributed to a second set of at least two of the multiple UAVs, and cause cooperative computational processing of the data through the UAV control circuits of the second set of UAVs and cooperatively identify based on the cooperative computational processing a second set of at least one task to be (Continued)

performed, and identify a set of at least two tool systems to be utilized by a third set of at least two of the multiple UAVs in cooperatively performing the second set of at least one task.

16 Claims, 6 Drawing Sheets

(51) Int. Cl.
*B64C 39/02* (2006.01)
*B64D 1/22* (2006.01)
B64D 1/16 (2006.01)
B64D 47/08 (2006.01)

(52) U.S. Cl.
CPC .. *B64C 2201/108* (2013.01); *B64C 2201/126* (2013.01); *B64C 2201/127* (2013.01); *B64C 2201/165* (2013.01); *B64D 1/16* (2013.01); *B64D 47/08* (2013.01)

(56) References Cited

U.S. PATENT DOCUMENTS

| | | | | |
|---|---|---|---|---|
| 6,840,480 | B2* | 1/2005 | Carroll | B64C 39/024 244/117 R |
| 7,451,023 | B2* | 11/2008 | Appleby | G05D 1/0088 701/120 |
| 7,564,347 | B2* | 7/2009 | Hansen | G06Q 10/06 340/539.13 |
| 7,610,122 | B2 | 10/2009 | Anderson | |
| 8,086,351 | B2* | 12/2011 | Gaudiano | G05D 1/104 700/245 |
| 8,509,963 | B1* | 8/2013 | Barnes | G06F 11/3013 340/540 |
| 8,660,712 | B2 | 2/2014 | Grabowsky | |
| 8,791,836 | B2* | 7/2014 | Herman | G08G 1/00 340/901 |
| 8,862,288 | B2* | 10/2014 | Vavrina | B60L 53/80 701/3 |
| 8,874,360 | B2* | 10/2014 | Klinger | G08G 1/162 701/22 |
| 8,967,526 | B2* | 3/2015 | Karem | B64C 1/00 244/36 |
| 8,977,481 | B1* | 3/2015 | Downs | G08G 5/0017 701/120 |
| 9,026,248 | B1* | 5/2015 | Hickman | B25J 3/00 700/248 |
| 9,056,676 | B1 | 6/2015 | Wang | |
| 9,064,222 | B2* | 6/2015 | Saad | G06Q 10/0631 |
| 9,194,948 | B1* | 11/2015 | Leonard | G01S 7/41 |
| 9,242,729 | B1* | 1/2016 | Wang | B64C 39/028 |
| 9,272,783 | B2 | 3/2016 | Pearson | |
| 9,311,760 | B2 | 4/2016 | Downey | |
| 9,376,208 | B1 | 6/2016 | Gentry | |
| 9,384,668 | B2 | 7/2016 | Raptopoulos | |
| 9,387,928 | B1* | 7/2016 | Gentry | B64C 39/024 |
| 9,459,620 | B1* | 10/2016 | Schaffalitzky | G05D 1/0016 |
| 9,466,219 | B1* | 10/2016 | Stefani | G08G 5/0039 |
| 9,550,577 | B1 | 1/2017 | Beckman | |
| 9,573,684 | B2 | 2/2017 | Kimchi | |
| 9,625,909 | B2* | 4/2017 | Hu | G08G 5/0069 |
| 9,752,878 | B2* | 9/2017 | Magson | G01C 21/00 |
| 9,805,598 | B2* | 10/2017 | Ishikawa | G08G 1/09 |
| 9,811,796 | B2* | 11/2017 | Ogilvie | G06Q 10/0832 |
| 9,828,094 | B2* | 11/2017 | McMillion | B64D 1/22 |
| 9,904,963 | B2* | 2/2018 | Rupp | H04W 4/70 |
| 9,952,591 | B2* | 4/2018 | Parekh | B64D 45/00 |
| 10,013,886 | B2* | 7/2018 | Blomberg | G08G 5/0013 |
| 10,162,351 | B2* | 12/2018 | Shaw | G05D 1/0027 |
| 10,163,357 | B2* | 12/2018 | Venkatraman | B64C 39/024 |
| 10,173,320 | B1* | 1/2019 | Prisament | B25J 9/1664 |
| 1,024,920 | A1 | 4/2019 | Passe | |
| 2003/0213358 | A1* | 11/2003 | Harding | G01S 7/22 89/1.11 |
| 2003/0229442 | A1* | 12/2003 | Mattheyses | G01C 21/00 701/533 |
| 2005/0055143 | A1* | 3/2005 | Doane | B64C 13/18 701/301 |
| 2006/0106506 | A1* | 5/2006 | Nichols | G05D 1/101 701/3 |
| 2006/0114324 | A1* | 6/2006 | Farmer | G01S 7/003 348/144 |
| 2006/0142903 | A1* | 6/2006 | Padan | G08G 5/045 701/3 |
| 2006/0184291 | A1* | 8/2006 | Paradis | F41H 13/00 701/23 |
| 2006/0184292 | A1* | 8/2006 | Appleby | F41H 13/00 701/23 |
| 2006/0271245 | A1* | 11/2006 | Herman | F41G 7/007 701/1 |
| 2007/0021879 | A1* | 1/2007 | DelNero | G05D 1/0088 701/23 |
| 2007/0023582 | A1* | 2/2007 | Steele | B64C 39/024 244/190 |
| 2007/0269077 | A1* | 11/2007 | Neff | F41H 13/00 382/103 |
| 2007/0288132 | A1* | 12/2007 | Lam | G05D 1/0278 701/23 |
| 2008/0208397 | A1* | 8/2008 | Miklos | G06Q 10/087 701/3 |
| 2009/0125163 | A1* | 5/2009 | Duggan | G05D 1/0061 701/2 |
| 2009/0299551 | A1 | 12/2009 | So | |
| 2010/0017046 | A1* | 1/2010 | Cheung | G01S 7/003 701/2 |
| 2010/0042269 | A1 | 2/2010 | Kokkeby | |
| 2010/0104185 | A1* | 4/2010 | Johnson | G06T 7/277 382/173 |
| 2010/0145514 | A1* | 6/2010 | Kim | B25J 9/161 700/248 |
| 2010/0312388 | A1* | 12/2010 | Jang | G06Q 10/0631 700/248 |
| 2011/0084162 | A1* | 4/2011 | Goossen | B64C 39/024 244/12.1 |
| 2011/0184604 | A1* | 7/2011 | Franke | G05D 1/0088 701/23 |
| 2012/0153087 | A1 | 6/2012 | Collette | |
| 2013/0240673 | A1* | 9/2013 | Schlosser | G05D 1/101 244/137.1 |
| 2014/0018979 | A1* | 1/2014 | Goossen | G08G 5/0034 701/3 |
| 2014/0025228 | A1* | 1/2014 | Jang | G06Q 10/047 701/2 |
| 2014/0032034 | A1* | 1/2014 | Raptopoulos | G08G 5/0069 701/25 |
| 2014/0061376 | A1* | 3/2014 | Fisher | B64D 27/24 244/62 |
| 2014/0081479 | A1 | 3/2014 | Vian | |
| 2014/0142785 | A1* | 5/2014 | Fuentes | G05D 1/0011 701/2 |
| 2014/0249693 | A1* | 9/2014 | Stark | B64C 39/024 701/2 |
| 2014/0303814 | A1* | 10/2014 | Burema | A01B 79/005 701/3 |
| 2014/0316616 | A1* | 10/2014 | Kugelmass | G05D 1/101 701/8 |
| 2015/0120094 | A1* | 4/2015 | Kimchi | B64C 39/024 701/3 |
| 2015/0234387 | A1* | 8/2015 | Mullan | G05D 1/104 701/3 |
| 2015/0277440 | A1 | 10/2015 | Kimchi | |
| 2015/0317596 | A1* | 11/2015 | Hejazi | G06Q 50/28 705/330 |
| 2015/0321349 | A1 | 11/2015 | Hazan | |
| 2015/0336671 | A1* | 11/2015 | Winn | B64C 39/024 701/3 |
| 2015/0344136 | A1 | 12/2015 | Dahlstrom | |
| 2015/0379874 | A1* | 12/2015 | Ubhi | G01S 5/0027 701/3 |
| 2016/0001883 | A1 | 1/2016 | Sanz | |

(56) References Cited

U.S. PATENT DOCUMENTS

| | | | |
|---|---|---|---|
| 2016/0039540 A1 | 2/2016 | Wang | |
| 2016/0050012 A1* | 2/2016 | Frolov | H04B 7/18506 455/431 |
| 2016/0050840 A1 | 2/2016 | Sauder | |
| 2016/0052027 A1* | 2/2016 | Chin | B08B 1/00 134/6 |
| 2016/0063987 A1 | 3/2016 | Xu | |
| 2016/0068264 A1* | 3/2016 | Ganesh | G08G 5/0069 701/2 |
| 2016/0070261 A1 | 3/2016 | Heilman | |
| 2016/0082460 A1* | 3/2016 | McMaster | B05B 9/007 701/2 |
| 2016/0090248 A1* | 3/2016 | Worsley | B65G 67/08 414/398 |
| 2016/0144734 A1* | 5/2016 | Wang | B60L 11/1822 701/17 |
| 2016/0155339 A1* | 6/2016 | Saad | G05D 1/0295 701/25 |
| 2016/0159496 A1* | 6/2016 | O'Toole | B64F 1/32 244/110 E |
| 2016/0196755 A1 | 7/2016 | Navot | |
| 2016/0216711 A1* | 7/2016 | Srivastava | G08G 5/0013 |
| 2016/0221688 A1 | 8/2016 | Moore | |
| 2016/0257401 A1* | 9/2016 | Buchmueller | B64C 39/024 |
| 2016/0307447 A1 | 10/2016 | Johnson | |
| 2017/0038780 A1* | 2/2017 | Fandetti | G05D 1/104 |
| 2017/0041451 A1* | 2/2017 | Wilkinson | H04W 4/027 |
| 2017/0057081 A1 | 3/2017 | Krohne | |
| 2017/0090483 A1* | 3/2017 | Smith | G05D 1/104 |
| 2017/0090484 A1* | 3/2017 | Obaidi | B64C 39/024 |
| 2017/0110017 A1 | 4/2017 | Kimchi | |
| 2017/0129603 A1* | 5/2017 | Raptopoulos | B64C 39/024 |
| 2017/0131727 A1 | 5/2017 | Kurdi | |
| 2017/0323235 A1 | 11/2017 | Johnston | |
| 2018/0072415 A1 | 3/2018 | Cantrell | |
| 2018/0072416 A1* | 3/2018 | Cantrell | B64C 39/024 |
| 2018/0074488 A1 | 3/2018 | Cantrell | |
| 2018/0074521 A1 | 3/2018 | Cantrell | |
| 2018/0074523 A1* | 3/2018 | Cantrell | G05D 1/104 |
| 2018/0101171 A1* | 4/2018 | Lemmer | H04L 67/12 |
| 2018/0217593 A1* | 8/2018 | Erickson | G05D 1/0088 |
| 2018/0284773 A1 | 10/2018 | Pratt | |
| 2018/0322749 A1 | 11/2018 | Kempel | |
| 2018/0357909 A1* | 12/2018 | Eyhorn | G05D 1/102 |
| 2018/0375568 A1 | 12/2018 | De Rosa | |

OTHER PUBLICATIONS

PCT; App. No. PCT/US2017/050668; International Search Report and Written Opinion dated Mar. 8, 2018.
PCT; App. No. PCT/US2017/050671; International Search Report and Written Opinion dated Mar. 8, 2018.
U.S. Appl. No. 15/699,942; Non-Final Office Action dated Apr. 3, 2018.
U.S. Appl. No. 15/699,919; Non-Final Office Action dated Mar. 30, 2018.
U.S. Appl. No. 15/699,906, filed Sep. 8, 2017, Cantrell.
U.S. Appl. No. 15/699,919, filed Sep. 8, 2017, Cantrell.
U.S. Appl. No. 15/699,926, filed Sep. 8, 2017, Cantrell.
U.S. Appl. No. 15/699,942, filed Sep. 8, 2017, Cantrell.
U.S. Appl. No. 15/699,952, filed Sep. 8, 2017, Cantrell.
Parrot; "Parrot Sequoia—Agricultural Drone Sensor—Capture the invisible"; https://www.youtube.com/watch?v=SaztuWuDEsg; published on Feb. 9, 2016; pp. 1-14.
PCT; App. No. PCT/US2017/050801; International Search Report and Written Opinion dated Nov. 21, 2017.
PCT; App. No. PCT/US2017/050720; International Search Report and Written Opinion dated Nov. 29, 2017.
PCT; App. No. PCT/US2017/050795; International Search Report and Written Opinion dated Jun. 11, 2018.
USPTO; U.S. Appl. No. 15/699,919; Notice of Allowance dated Aug. 10, 2018.
USPTO; U.S. Appl. No. 15/699,919; Notice of Allowance dated Nov. 28, 2018.
USPTO; U.S. Appl. No. 15/699,942; Notice of Allowance dated Jan. 2, 2019.
USPTO; U.S. Appl. No. 15/699,942; Notice of Allowance dated Aug. 31, 2018.
USPTO; U.S. Appl. No. 15/699,952; Office Action dated Apr. 10, 2019.

\* cited by examiner

GEOGRAPHIC AREA MONITORING SYSTEMS AND METHODS UTILIZING COMPUTATIONAL SHARING ACROSS MULTIPLE UNMANNED VEHICLES

CROSS-REFERENCE TO RELATED APPLICATION

This application claims the benefit of U.S. Provisional Application No. 62/385,381, filed Sep. 9, 2016, which is incorporated herein by reference in its entirety.

TECHNICAL FIELD

This invention relates generally to monitoring geographic areas.

BACKGROUND

Geographic areas can have numerous different uses. Often, activities and/or conditions regarding the areas may be determined and monitored. Obtaining the information can be time consuming and costly.

BRIEF DESCRIPTION OF THE DRAWINGS

Disclosed herein are embodiments of systems, apparatuses and methods to monitor areas with unmanned vehicles. This description includes drawings, wherein.

Figure 1:
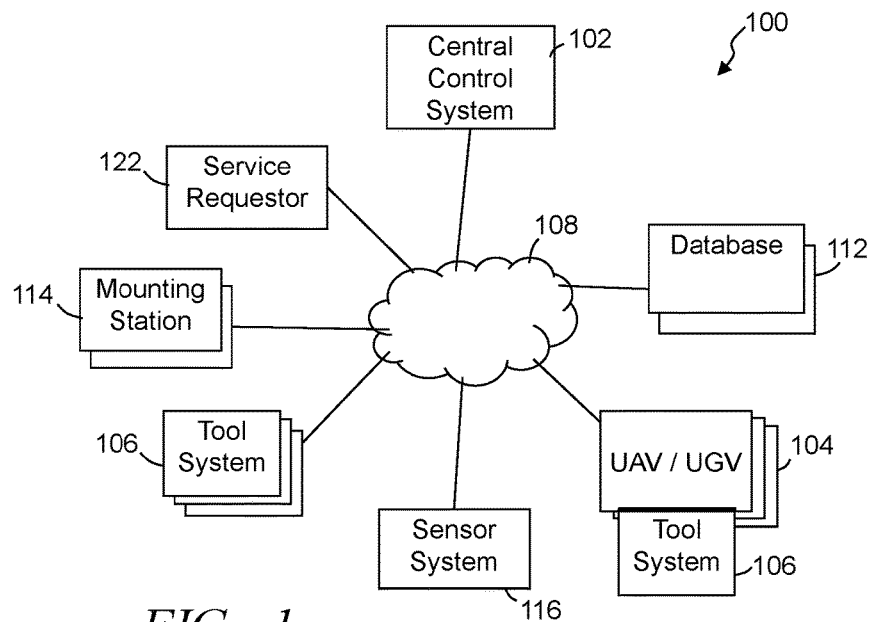
FIG. 1 illustrates a simplified block diagram of an exemplary unmanned vehicle task coordination system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided to utilize unmanned aerial vehicles (UAVs) to perform various tasks at one or more geographic areas. In some embodiments, the UAVs can include a UAV control circuit cooperated with one or more motors and a propulsion system coupled with the motor and configured to enable the UAV to move itself. The UAV control circuit can identify a task to be performed by the UAV and to identify a set of one or more tool systems to be used to perform the task. The UAV control circuit is further configured to control the operation of the UAV in directing the UAV to interchangeably and temporarily couple with at least one of the set of tool systems in order to initiate the task the UAV determined is to be performed. In some embodiments, a UAV further includes a universal coupler that includes a coupling system, and in some implementations includes a communication bus communicatively coupled with the UAV control circuit. The universal coupler enables the interchangeable coupling and decoupling of one or more of multiple different tool systems each having different functions to be put into use while and/or after carried by the UAV. The coupling system of the universal coupler secures at least one tool system with the UAV, and in some instances enables a communication connection between the communication bus and the tool system. The tool systems each are configured to perform at least one function. The different functions capable of being performed by the different tool systems are numerous. For example, some of the tool systems include a package securing tool system configured to retain and enable transport of a package while being delivered, a sensor tool system configured to sense a condition and communicate sensor data of the sensed condition to the UAV control circuit over the communication bus, camera tool systems configured to capture images and/or video, lighting tool systems configured to emit light at an intended wavelength, chemical dispensing systems configured to dispense a chemical at one or more locations and/or over at least a portion of a geographic area, and other such tool systems.

FIG. 1 illustrates a simplified block diagram of an exemplary unmanned vehicle task coordination system 100, in accordance with some embodiments. The system includes one or more central control systems 102 and multiple unmanned aerial vehicles (UAV) 104. The system may additionally or alternatively include multiple unmanned ground vehicles (UGV), marine or aquatic unmanned vehicles (subsurface and/or above surface), amphibious unmanned vehicles, other such unmanned vehicles, or combination of two or more of such types of unmanned vehicles. In an effort to simplify the description, the below is described with reference to UAVs; however, some or all of the operations, functions, and/or features of the system can be implemented through UGVs, marine unmanned vehicles, amphibious vehicles, UAVs, other such unmanned vehicles, or combination of two or more of such unmanned vehicles. At least some of the UAVs are configured to releasably cooperate with one or more tool systems 106 that each can be utilized to perform one or more tasks and/or provide functionality to the UAVs. The central control system 102 is configured to communicate, via wired and/or wireless communication, with the UAVs 104 through one or more computer and/or communication networks 108. Further, in some embodiments, the central control system and/or the UAVs may have access to one or more databases 112 of information, programming, code, data and/or other such relevant information through direct coupling and/or via the one or more networks 108.

In some embodiments, the task coordination system 100 may include one or more mounting stations 114 and/or docking stations. At least some of the mounting stations are configured to support one or more tool systems 106 in a predefined orientation and/or configuration to enable the UAVs to temporarily cooperate with and remove one or more tool systems. Further, the mounting stations may be configured to allow UAVs to position one or more tool systems with the mounting station and disengage from one or more tool systems. In some implementations, a UAV may communicate with the mounting station providing information about a tool system to be retrieved, and the mounting station can take steps to prepare the tool system (e.g., direct power to the tool system to recharge the internal power source, move the tool system into a position to be cooperated with the UAV, confirm the tool system is in operating conditions (e.g., based on previous input information, applying testing, etc.), and/or other such actions).

The task coordination system 100 may, in some embodiments, include one or more sensors and/or sensor systems 116 that can communication information to the UAVs and/or the central control system. Further, one or more of the sensor systems may be incorporated into tool systems to be carried by, implemented by and/or utilized by a UAV. The sensor systems may communicate directly with a UAV and/or communicate via wired and/or wireless communication over one or more of the computer and/or communication networks 108. In some embodiments, the system 100 may include one or more remote scheduling and/or service requestors 122 configured to provide scheduling of tasks and/or submit requests that one or more tasks be performed. Typically, the scheduling and/or requests are communicated to the central control system 102; however, in some instances, the scheduling and/or requests may be directed to one or more of the UAVs 104.

Figure 2:
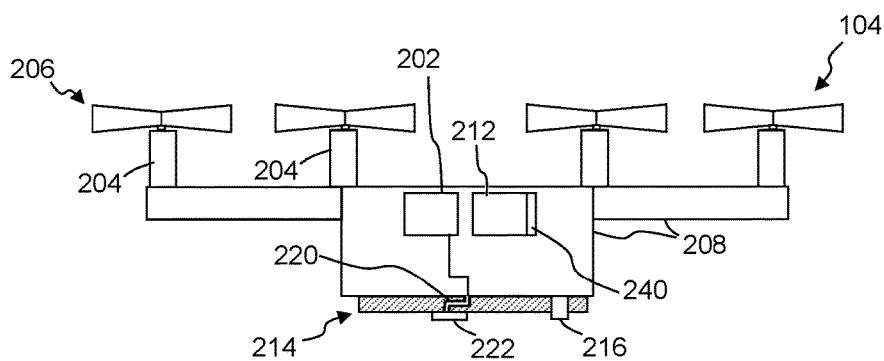
FIG. 2 illustrates a simplified block diagram, cross-sectional view of an exemplary UAV, in accordance with some embodiments.
Figure 3:
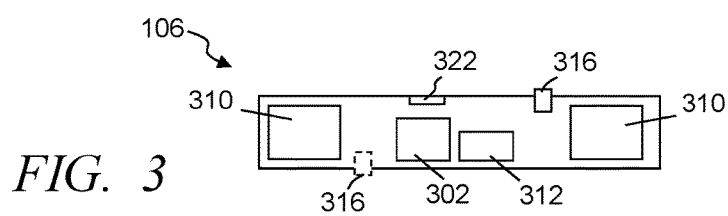
FIG. 3 illustrates a simplified block diagram of an exemplary tool system, in accordance with some embodiments.

FIG. 2 illustrates a simplified block diagram, cross-sectional view of an exemplary UAV 104, in accordance with some embodiments. FIG. 3 illustrates a simplified block diagram of an exemplary tool system 106, in accordance with some embodiments. Referring to FIGS. 1-3, the UAV 104 includes one or more UAV control circuits 202, one or more lift motors 204, one or more propulsion systems 206 and a substructural support 208, body, frame, housing and/or other support structure to support at least the plurality of lift motors, propulsion systems and other components of the UAV. In some embodiments, the substructural support includes a housing that encloses some or all of a series of components. In other embodiments, the substructural support comprises a simple framing that supports the components for operation. Further, the substructural support may be configured, in some applications, to enable components to be readily added or removed and/or to enable parts of the substructural support to be removed or added.

A UAV control circuit 202 is secured with the substructural support and couples with the lift motors and in part is configured to control the operation of the lift motors in controlling lift and movement of the UAV. Each propulsion system 206 may include one or more propellers, gearing and the like that cooperate with one or more of the lift motors. Similarly, in some embodiments, with some UAVs and/or UGVs, the propulsion system may include one or more wheels, axels, gearing, transmissions and/or other such components to enable movement along the ground or other surface. In some instances, the UAV control circuit controls the rotations per minute of the propellers (or wheels) to achieve the desired lift and/or propulsion for the UAV.

Typically, the UAV further includes a rechargeable electrical power source 212 coupled with the UAV control circuit and the plurality of lift motors supplying electrical power to the UAV control circuit and the plurality of lift motors. The rechargeable power source can include one or more rechargeable batteries, capacitors, other such electrical power storage devices, or combination of two or more of such power sources. Some embodiments further include one or more sets of photovoltaic cells and/or solar panels to supply electrical power to the rechargeable power source. Additionally or alternatively, the UAV may include a power coupler to enable the UAV to temporarily electrically couple with an external power source to recharge the rechargeable power source.

Further, many if not all of the UAVs 104 of the task coordination system 100 further include a universal coupler 214 configured to interchangeably couple and decouple one or more of the multiple different tool systems 106 with the UAV. Again, different tool systems may be configured to perform different functions and/or be used while implementing different tasks. By enabling the interchanging of tool systems, a single UAV can be utilized to implement multiple different tasks.

In some embodiments, the universal coupler includes one or more coupling systems 216 configured to secure at least one of tool systems with the UAV. At least some of the tool systems 106 similarly include one or more coupling systems 316 that are configured to securely couple with and decouple from at least one coupling system 216 of a universal coupler 214. Further, in some embodiments, the universal coupler includes one or more communication buses 220, lines, or the like that communicatively coupled with the UAV control circuit 202, and can further communicatively couple with at least one or more communication interfaces 222, ports, contacts, and/or other such communication connections, which are configured to communicatively coupled with one or more similar or mating communication interfaces 322, ports, contacts, and/or other such communication connections of a cooperated tool system 106. Similarly, the tool system includes a communication line, bus or the like establishing communication between at least the tool system control circuit 302 and the one or more communication interfaces 322.

The coupling systems 216, 316 and/or the universal coupler 214 can include one or more slots, latching systems, retractable pins, pin apertures to receive retractable pins, biased levers, notches, guide rails, slots or grooves (e.g., to receive guide rails), rotational bars with corresponding motors and corresponding cavities to receive and allow the bars to rotate, one or more sets of magnets, one or more sets of electromagnets, flexible latches and corresponding ledges or other engaging surfaces, threaded bolts and corresponding threaded apertures, clips, other such structures, or combination of two or more of such securing structures to temporarily secure at least one tool system 106 with the universal coupler. One or more actuators, motors or the like may be included with the coupling system and controlled by the UAV control circuit to cause the coupling system to engage, lock or otherwise secure a tool system with the UAV, and similarly cause the coupling system to unlock, disengage or otherwise release the tool system to allow the UAV to separate from the tool system. While secured, the communication interface 222 is configured to establish a communication connection between the communication bus 220 and one or more tool systems 106.

Still referring to FIGS. 1-3, the tool systems 106 include one or more functional systems 310 that are configured to provide the functionality to the tool system to enable the tool system to perform one or more functions and/or tasks. In some implementations, for example, a functional system 310 may include: one or more cameras to enable a tool system to capture images and/or video content; one or more sensors to enable the tool system to obtain sensor data that can be communicated to the UAV control circuit and/or a remote processing system (e.g., the central control system 102, third party processing system and/or service, etc.); one or more package securing tool systems configured to retain and enable transport of one or more items (e.g., packages while being delivered, moved or the like); one or more lighting systems to emit light over a desired area; one or more chemical dispensing systems; one or more communication systems to enable the tool system to provide a communication hub, repeater, network access point, and/or other such communication functionality; one or more audio systems to capture audio content and/or playback audio content; one or more electrical charge emitters; one or more radar systems; one or more motion detectors; one or more sonar systems; one or more laser systems; one or more distance measurement systems; one or more light detectors; one or more humidity sensors; one or more chemical detector systems; one or more soil testing systems; one or more infrared camera systems; one or more insect zapping systems; one or more produce evaluation systems (e.g., light emitting system and corresponding detect to evaluate color, density, etc.); one or more ground penetrating radar systems; other such functional systems; or combination of two or more of such functional systems. The sensors can be substantially any relevant sensor and may be activated while the UAV is in flight, while the UAV is hovering, while the UAV is in a stationary position (e.g., on the ground, on or in a mounting station, on or in a staging area, etc.), and/or when a tool system is disengaged from the UAV (e.g., UAV may be tasks to transport and position a sensor tool system to within a threshold distance of a predefined location). By enabling the coupling and decoupling of the multiple different tool systems, individual UAVs can be utilized to implement different functions and/or tasks. Similarly, the UAVs do not have to carry excess functionality that may add weight and/or cause a drain on power, which can result in reduced operating times, less range of travel, reduced potential functionality, and the like. Instead, the UAVs can disengage from a tool system that does not include a functional system intended to be utilized by the UAV and/or that a UAV is not transporting.

In some embodiments, the tool system includes one or more tool system control circuits 302 configured to provide at least some control over the one or more functional systems 310 and/or to obtain information from one or more functional systems. Some embodiments enable the UAV control circuit 202 to provide at least some control over the functional systems 310 directly or through the tool system control circuit 302, while in other embodiments the tool system may not include a tool system control circuit and the UAV control circuit may directly control the one or more functional systems through the communication interfaces 222, 322. In other embodiments, the tool control system can control at least the functional systems independent of the UAV. Further, the UAV control circuit may provide information to the tool system control circuit and/or the functional system, and/or relay information to the tool system control circuit and/or the functional system. In some embodiments, the tool system further includes computer and/or processor memory configured to store data, such as sensor information, operating parameters, operating instructions, and/or other such information that may be accessed by the tool system control circuit 302 and/or the UAV control circuit 202 of the UAV cooperated with the tool system. Further, the memory of the tool system may be utilized to store information so that the UAV does not have to store the information. For example, sensor data captured by one or more sensor functional systems can be stored on the tool system instead of storing the information in computer and/or processor readable memory of the UAV.

In some applications, the UAV supplies power to the tool system to operate the one or more functional systems 310. Some tool systems 106 may include one or more power sources 312 that provide power to the tool system control circuit 302 and one or more functional systems 310. Typically, the tool system power source 312 is a rechargeable power source enabling repeated recharging and discharging of the power source. The tool system can be configured to couple with a power line or other coupling of a mounting station 114 or other source to recharge the tool system power source. The power stored in the tool system power source 312 allows the tool system to operate while limiting or preventing drawing power from the UAV, which can allow for greater operating durations of the UAV. Additionally or alternatively, the UAV may supply power to recharge the tool system power source. Similarly, the UAV may in some instances draw power from the tool system power source to extend operation of the UAV. In some embodiments, the UAV may not include a power source or have a limited power source 212, and draw power from the one or more tool systems cooperated with the UAV.

Figure 4:
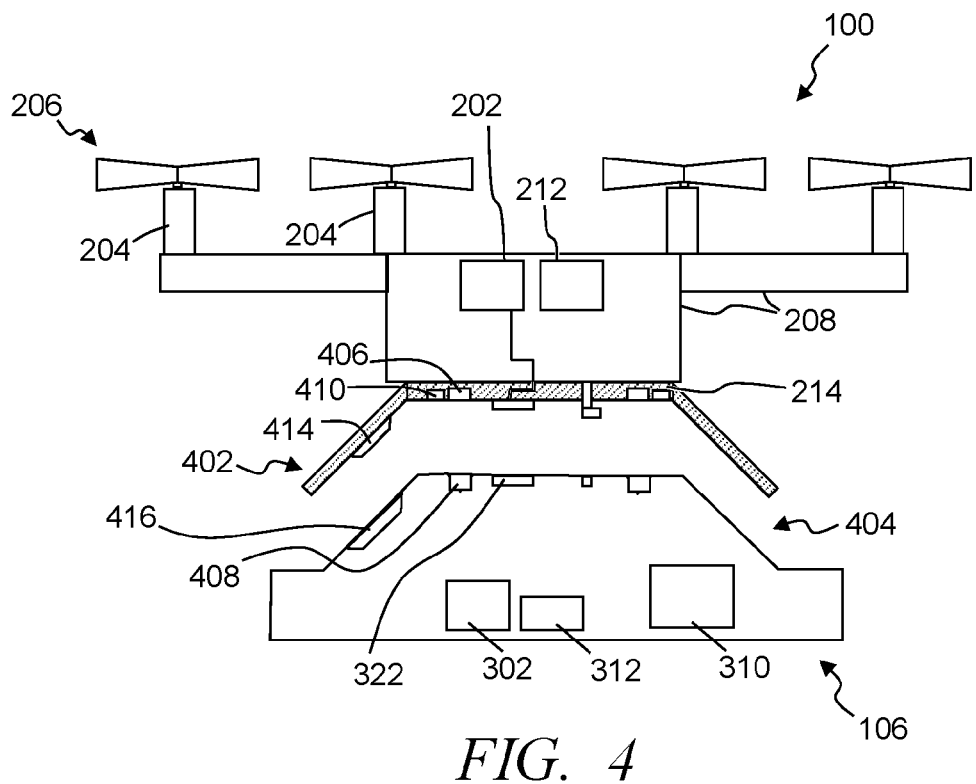
FIG. 4 illustrates a simplified block diagram, cross-sectional view of an exemplary UAV and an exemplary tool system, in accordance with some embodiments.

FIG. 4 illustrates a simplified block diagram, cross-sectional view of an exemplary UAV 104 and an exemplary tool system 106, in accordance with some embodiments. Referring to FIGS. 1-4, in some embodiments, the universal coupler 214 includes one or more alignment assemblies and/or systems that are configured to aid in aligning the universal coupler with a coupler system of a tool system. Similarly, the tool system may additionally or alternatively include one or more alignment assemblies and/or systems, which in some instances are configured to cooperate with alignment assemblies and/or systems of the universal coupler. The alignment systems can include one or more assemblies, structures and/or components to aid in cooperating and/or aligning the UAV with the tool system and/or the tool system with the UAV. In some embodiments, for example, an alignment system of the universal coupler may include a tapered and/or generally cone shaped cavity 402, while the alignment system of the tool system may include a corresponding tapered or generally cone shaped protrusion 404. The universal coupler 214, in some embodiments, may additionally or alternatively include one or more alignment structures 414 configured to engage and cooperate with one or more alignment structures 416 of a tool system as at least one of the tool system and the UAV is moved to cause the secure coupling between the UAV and the tool system. For example, one more protrusions, rails, guides, or the like may be configured to engage one or more corresponding recesses, slots, or the like. In some instances, the alignment structure 414 may include an extension and the alignment structure 416 may include a stop element with the extension configured to engage the stop element formed in a mating surface of the tool system.

In some embodiments, the UAV and/or the universal coupler include one or more sets of at least one permanent magnet 406 positioned to interact with a surface of the tool system and/or one or more sets of at least one permanent magnet 408 of a tool system 106 being cooperated with the universal coupler 214. In some applications, the sets of magnets can at least assist in aligning the tool system with the universal coupler, and in some instances aid in maintaining a position of the tool system relative to the universal coupler. Additionally or alternatively, in some embodiments, the universal coupler and/or tool system includes one or more sets of at least one electromagnet 410, which in some applications may be positioned relative to at least one of the permanent magnets 406, 408. The UAV control circuit can be configured to activate the set of electromagnets 410 to aid in disengaging from the tool system. In some instances, the electromagnets can be activated to in part overcome a magnetic force relative to one or more sets of permanent magnets to cause a decoupling of the tool system from the UAV.

Figure 5:
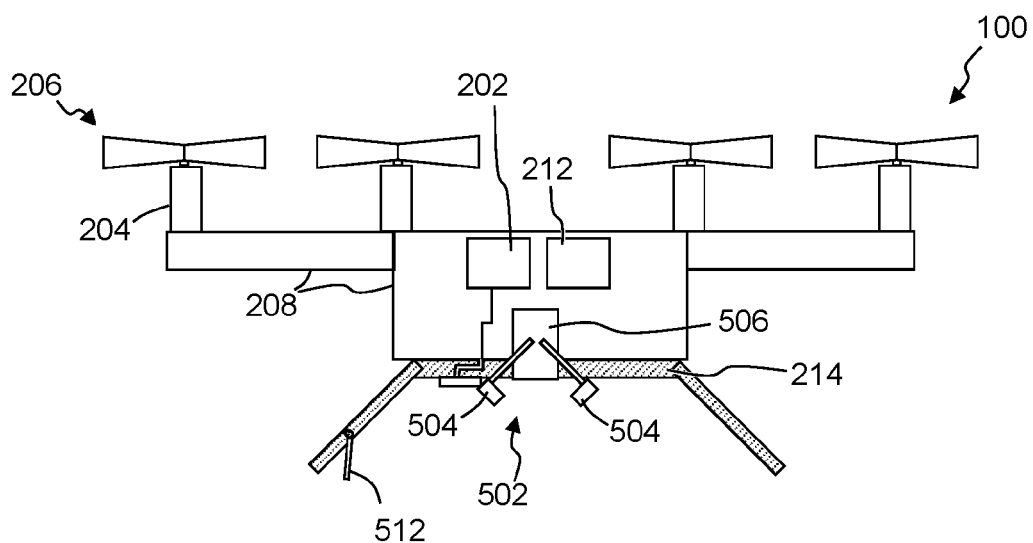
FIG. 5 illustrates a simplified block diagram, cross-sectional view of an exemplary UAV, in accordance with some embodiments.

FIG. 5 illustrates a simplified block diagram, cross-sectional view of an exemplary UAV 104, in accordance with some embodiments. The UAV and/or the universal coupler 214 includes one or more gripping systems 502. In some embodiments, the gripping system comprises one or more claw elements 504, contracting elements and/or other such elements configured to expand and retract as controlled by the UAV control circuit to grip one or more tool systems or other items (e.g., packages, tools, etc.). Further, in some applications the gripping system may include or be secured with an extending and retracting system 506 that can extend and retract the gripping system or at least the claw elements away from and toward the substructural support 208. The gripping system can, for example, be extended to cooperate with a grip feature of a tool system, and be retracted to secure and couple the tool system with the UAV. The extending and retracting system 506 can include a crane system (e.g., with one or more crane motors, spools and cable or rope that can be lowered and retracted through the rotation of the spool by the crane motor), piston and cooperated hydraulics or other compressed gas or fluid, and/or other such systems. For example, a tool system may include a crane system and package delivery system described in U.S. Patent Application No. 62/222,572, filed Sep. 23, 2015, entitled Systems and Methods of Delivering Products with Unmanned Delivery Aircraft, which is incorporated herein by reference in its entirety. As another example, the tool system may include and/or cooperate with a package cooperation and release system described in U.S. Patent Application No. 62/222,575, filed Sep. 23, 2015, entitled Package Release System for Use in Delivery Packages, and Methods of Delivering Packages, which is incorporated herein by reference in its entirety.

In some implementations, the tool system may rotate as the extending and retracting system retracts a gripped tool system. As such, in some embodiments the universal coupler may comprises one or more structures and/or components to limit or stop the rotation. For example, some embodiments include one or more extensions 512 that is configured to engage a stop element formed in a mating surface of the tool system. The extension may further at least assist in aligning and inhibiting rotation of the tool system while the gripping system is retracted at least a threshold distance from the universal coupler. For example, the extension may be a spring biased rod, a flexible rod or other such extension that engages a ridge, recess, groove or other structure formed in a surface of the tool system. In other instances, for example, the stop element may be a recess or groove in the universal coupler that is engaged by a protrusion, flexible rod, or other such extension on the tool system.

The task coordination system 100 utilizes one or more UAVs to implement one or more tasks. As described above, the tasks can be substantially any relevant task that can be performed by one or more UAVs and/or one or more tool systems cooperated with and/or transported by one or more UAVs. In some implementations, one or more tasks may be scheduled and initiated by the central control system 102. These tasks can include tasks that are regularly performed, tasks where timing of when a task is performed may need to be controlled, tasks that are instructed by a user through the central control system, tasks the central control system determines are to be performed based on sensor information, tasks that a UAV determines should be performed and is directed to be performed through the central control system, and other such tasks. The central control system can identify one or more UAVs and one or more tool systems to be utilized to perform the one or more tasks. One or more instructions can be wired and/or wirelessly communicated by the central control system to one or more UAVs to direct the UAVs to cooperate with one or more tool systems, when the functionality is not already available from the UAV or when a UAV does not have a relevant tool system with the needed functionality. Instructions can further be provided to the one or more UAVs and/or relevant tool systems to be utilized in implementing the one or more tasks. The instructions, for example, may specify timing, location of the task, location of a tool system, directions regarding how to perform the task, routing to be followed in performing the task, and/or other such instructions. Further, in some applications, the central control system may evaluate power levels of one or more UAVs and/or tool systems in selecting a UAV and/or tool system to be instructed to implement some or all of the task or tasks. In some instances, tasks may be associated with a priority level. Accordingly, some scheduled tasks may take priority over some tasks that a UAV determines should be performed, while in other instances one or more tasks that a UAV determines should be performed may have priority over one or more scheduled tasks.

In some applications, the central control circuit may further evaluate information, such as sensor information, user entered data and/or instructions, parameters and/or other such information in determining whether one or more tasks are to be performed. Similarly, in some embodiments, the UAV control circuit of one or more UAVs can be configured to identify one or more tasks to be performed and/or tool systems to be used to perform one or more tasks. The UAV control circuit can, for example, obtain sensor information from one or more external sensors, internal sensors, sensors of one or more tool systems cooperated with the UAV, information from the central control system, information corresponding to a task or mission to be performed, and/or information from other sources in identifying one or more tasks to be performed and/or the one or more tool systems to be used to perform the tasks. The UAV control circuit may apply internal analytics on relevant information to identify one or more tasks to be performed, and identify one or more tool systems to be used to implement the one or more tasks. The analytics can include, for example, evaluating sensor data captured by a first tool relative to one or more thresholds corresponding to that sensor data, and identifying one or more predefined tasks that are associated with the sensor data having a predefined relationship with the one or more thresholds. For example, a sensor may detect the presence of a threshold quantity of a predefined pest. The UAV control circuit and/or central control system may determine based on the detection of the threshold quantity of the pest that a predefined pesticide is to be applied. The UAV control circuit and/or central control system can identify one or more tool systems that can apply the pesticide over a determined area (e.g., which may also be based on location information associated with the sensor data detecting the pest). Similarly, the UAV control circuit and/or central control system can identify one or more UAVs to cooperate with the identified tool systems and implement the task of applying the pesticide. Some embodiments may further direct instructions to one or more workers, such as directing one or more workers to prepare a tool system. In the above example, one or more workers may be directed to ensure a threshold quantity of the pesticide is loaded into the one or more chemical applying tool systems.

In some embodiments, the UAV control circuit may identify a task to be performed based at least in part on a current or previous task performed using one or more tool systems that are temporarily coupled with the UAV. Further, the UAV control circuit may determine whether the task is to be performed by the UAV and/or one or more other UAVs. Additionally, the UAV control circuit can identify one or more tool systems to be used to perform the task identified to be performed. For example, the UAV may identify that a subsequent task is needed to be performed based on a current task being performed by the UAV or tool system carried by the UAV. Similarly, a subsequent task may be identified based on information received from a tool system being carried by another UAV. In some embodiments, the UAV control circuit may receive sensor data from a tool system carried by the UAV and obtained while performing a first task. Based on the sensor data received through the tool system, the UAV control circuit can identify a second task and a second tool system to be used in performing the second task.

When a different tool system is needed to perform the task, the UAV control circuit may identify a location of the different tool system. The identification of a location of the different tool system may be through one or more databases storing information about tool system identifiers, corresponding functionalities and their current locations, and/or identification of a UAV with which the tool system is cooperated. The UAV may access the database, access information of a distributed ledger, may communicate a request to the central control system 102 to provide database information relative to the desired tool system, communicate with one or more other UAVs to identify locations of a desired tool system (e.g., a different UAV may respond that it is carrying the desired tool system and/or it is aware of a mounting station 114 where the desired tool system is located), and other such sources.

As described above, at least some of the UAVs include the universal coupler. Accordingly, in some instances, a UAV control circuit can cause and/or activate a decoupling of a first tool system from universal coupler of the UAV, and direct the coupling of a different second tool system with the universal coupler following the decoupling of the first tool system. In some instances the second tool system can be accessed at one of one or more mounting stations 114. The mounting station may be proximate to and/or within a geographic area being monitored by the system 100, while in other implementations may be remote from the geographic area. The UAV control circuit can control the lift motors 204 and propulsion systems 206 to direct the UAV to a mounting station to temporarily couple the universal coupler of the UAV with the second tool system, and subsequently control the propulsion system to direct the UAV to a task location and activate the second tool system in performing the second task.

The mounting station can include at least one tool docking station to support at least one tool system in a position that enables one or more UAVs to cooperate with an intended tool system. Further, the mounting station can be configured to store or support multiple different tool systems as well as one or more empty tool docking station to receive tool systems that a UAV no longer needs. In some embodiments, the tool docking station include an electrical coupling configured to electrically couple with a tool system to supply power to the tool system and/or recharge an internal rechargeable power source 312 while awaiting to be used and/or transported by a UAV. The mounting station can include a control circuit and/or one or more communication transceivers enabling the mounting station to further establish wired and/or wireless communication with the tool system to enable retrieval and/or transfer of data (e.g., sensor data, image and/or video content, task parameters and/or history accumulated while performing a task (e.g., quantity of chemical dispensed, light exposure duration, ultrasound data, operation timing, etc.), other such data, or combination of two or more of such data). Similarly, the mounting station may be configured to establish wired and/or wireless communication with a UAV. Some embodiments further include one or more communication couplers that are configured to physically couple with at least one corresponding communication coupler on a tool system and/or UAV. Additionally, in some embodiments, the mounting station may further include one or more UAV docking stations configured to allow one or more UAVs to temporarily dock with the mounting station to recharge one or more rechargeable power sources of the UAV and/or to store the UAV while not in use.

The one or more tool systems mounted on a mounting station are typically positions to enable a UAV to cooperate with the tool system. In some embodiments, the task coordination system 100 includes one or more mounting stations 114 each configured to support at least one tool system at least while being cooperated with a UAV. Further, some mounting stations include one or more alignment systems that cooperate with an alignment system of a UAV or universal coupler as at least one of the UAV and a mounting station is moved to cause the cooperation between the alignment system of the UAV and the alignment system of the mounting station to align at least a tool system with the universal coupler enabling secure coupling between the UAV and the tool system.

In other instances, a UAV may obtain a tool system from another UAV. The UAV control circuit of a first UAV and/or the central control system may identify one or more other UAVs carrying, having access to and/or being at a position proximate to a tool system needed by the first UAV. The UAV and/or central control system can communicate instructions to a second UAV to disengage from the tool system and/or transport the tool system to a location and/or mounting station and disengage from the tool system. For example, the UAV control circuit of the first UAV may identify a second UAV temporarily coupled with the desired second tool system, and control the propulsion system to enable the first UAV to retrieve the second tool system from the second UAV. In still other instances, the disengagement of the second tool system from the second UAV may occur only after the first UAV is in position to cooperate with the second tool system. In some embodiments, the first UAV and second UAV may exchange the tool system while in flight (e.g., the first UAV may position itself and the universal coupler above the second UAV, and the second UAV can release the tool system up to the first UAV).

Further, in some embodiments, the central control system 102 may direct two or more UAVs to cooperatively perform a task. This cooperative operation may include two separate UAVs each cooperated with the same kind of tool system or different tool systems to cooperatively operate to perform parts of a task. For example, multiple UAVs may be directed to evaluate an area of crops in an attempt to identify and/or address one or more types of insects or pests (e.g., tool systems to dispense a chemical, tool system to emit a light at a predefined wavelength, etc.). As another example, two or more UAVs may be directed to utilize sensor tool systems to obtain sensor data corresponding to a geographic area. Similarly, in some embodiments a UAV control circuit may identify that at least a second UAV is to be used to cooperatively perform at least a portion of a task. This determination may be based on an amount of geographic area to be covered in performing the task, the quantity of a material to be applied to an area, a weight and/or size of a tool system, expected duration of time needed to perform the task, and/or other such factors. The UAV control circuit can cause a notification to be communicated to the second UAV control circuit directing the second UAV to perform at least the portion of the task in cooperation with the first UAV. Again, the second UAV may utilize the same or a different tool system in cooperatively performing the task.

As a further example, in some embodiment a UAV control circuit of a first UAV and/or the central control system may use sensor data obtained from a first tool system carried by the first UAV and/or other sensor data from other sensors to detect a threshold level of infestation of a pest. Based on the threshold level of infestation, the UAV control circuit and/or central control system can identify that at least a predefined quantity of pest repellant is to be applied to a known or determined geographic area of one or more crops. Further, based on the size of the geographic area and quantity of repellant, a duration of time can be predicted to apply the pest repellant to each of multiple sub-areas and identify a number of UAVs to be utilized to apply at least the pest repellant to the multiple sub-areas, which together cover the geographic area, within an application threshold period of time (e.g., want to apply the repellant within three hours to limit damage potentially caused by the detected pest). Similarly, the UAV control circuit and/or central control system can select and direct the number of UAVs to cooperate with a first type of tool system that includes a pest repellant dispensing functional system with a reservoir to carry the repellant and dispenser to dispense the repellant. In some instances, further instructions can be provided regarding applying settings to the tool systems (e.g., rate of dispensing, pressure when dispensing, dispensing pattern (e.g., mist, stream, spray, fog, etc.), and/or other such settings) and/or UAV settings (e.g., altitude of flight during dispensing, route information to a sub-area, route information while implementing the dispensing of the repellant, speed of travel while dispensing, and/or other such settings).

In some embodiments, a UAV control circuit may continue to evaluate sensor data and/or other parameters (e.g., power level of the UAV and/or tool system, estimated percentage of completion of the task, remaining quantity of a chemical being applied, etc.) while implementing a task. Based on the sensor data and/or parameter information the UAV may determine that the UAV and/or a tool system will be unable to fully complete the task. Accordingly, the UAV control circuit may identify another UAV and/or tool system to take over to complete the task. Similarly, the UAV control circuit may notify the central control system of the determination that the UAV and/or tool system will be unable to complete the task allowing the central control system to identify a subsequent UAV. In other implementations, the sensor data and/or parameters can additionally or alternatively be evaluated by the central control system to allow the central control system to predict that the UAV and/or tool system are unlikely to be able to complete the task and identify a subsequent UAV and/or tool system.

In other instances, multiple UAVs may cooperatively operate in performing a task with the multiple UAVs physically coupling together and/or multiple UAVs coupling with a single tool system. Some tool systems, for example, may have a weight that exceeds a single UAV's lift capacity and/or may have a size that limits a single UAV's ability to effectively transport and/or utilize the tool system. Accordingly, the central control system and/or a UAV control circuit may direct multiple UAVs to cooperate to implement a task and/or utilize a tool system. In some embodiments, a UAV control circuit of a first UAV can control the propulsion system 206 to cause the first UAV to temporarily cooperate with a universal coupler of a second UAV to allow the two UAVs to cooperatively perform at least a portion of a task. The universal coupler of the first UAV can be configured to temporarily couple with another universal coupler of a second UAV and maintain a position of the first UAV relative to the second UAV while the first UAV and second UAV are in motion. In some embodiments, the universal couplers of multiple UAVs can be utilized to couple multiple UAVs together and/or to create a stack, train or chain of UAVs. In other instances, the universal couplers of multiple UAVs may be temporarily secured with a cooperative coupler or bridge structure that can include one or more additional universal couplers to couple with one or more tool systems. The universal coupler may include multiple coupling systems 216 to allow a first coupling system to couple with a tool system and a second coupling system to couple with another UAV. Similarly, the orientation of the coupling systems of one or more universal couplers on a UAV can be directed down, up, toward a side, or other orientation depending on an intended implementation. FIGS. 2 and 4-5 illustrate the universal coupler with a single coupling system 216 orientated downward to couple with a tool system positioned underneath the UAV. In other implementations, however, the universal coupler may include a coupling system directed upward, laterally, or downward. In some instances a universal coupler may include multiple coupler systems oriented in different directions.

In some embodiments, one or more tool systems may include a universal coupler and/or second coupling system 316 to enable coupling with a second UAV and/or another tool system. When cooperated with a second tool system a single UAV may be able to simultaneously cooperate with multiple tool systems (e.g., stacked, chained, etc.). Communication between the UAV and the multiple tool systems may be through a daisy chain coupling between the chained tool systems. In other embodiments, a UAV may include a specific coupler that is configured to secure with a specific coupler of a tool system. This may restrict the use of some tool systems to being cooperated with specifically configured UAVs. As described above, in some embodiments, a UAV may include multiple universal couplers allowing multiple tool systems to simultaneously couple with the UAV, and/or a universal coupler may include multiple coupling systems 216 that allows multiple tool systems to simultaneously couple with the single universal coupler.

Again, in some instances a task which may be performed by a single UAV or cooperatively performed by a plurality of UAVs may be scheduled, while in other instances the UAV control circuit may determine the task to be performed based on sensor data and/or other information available to the UAV control circuit. In some embodiments, the coordination of multiple UAVs to operate together and/or to physically couple to perform one or more tasks may be coordinated by a UAV control circuit, between UAVs, by the central control system, or the like. The UAV control circuit of a first UAV, for example, may communicate directly with the UAV control circuit of a second UAV to coordinate the operation of both the first UAV and the second UAV in performing at least a portion of one or more tasks.

The task coordination system 100, in some embodiments, may include a UAV database that is accessible to the central control system and/or one or more UAV control circuits via the communication network 108. The UAV database can store UAV capability data defining operational capabilities of each of the multiple UAVs, UAV historic information and/or other such information. The UAV capabilities can include specification capabilities provided by a UAV manufacturer (e.g., lift capabilities, flight duration capabilities, size, communications capabilities, on-board sensors, flight speeds, other information, and typically a combination of two or more of such information). Further the UAV database can store operating capacity and/or capabilities. The operating capabilities can include real time data corresponding to conditions of the UAV, such as but not limited to remaining battery power, current location information, current intended route information, tool system identifiers of one or more tool systems cooperated with the UAV, estimated remaining flight capabilities, altitude information, error data, operational status information, sensor data from one or more internal UAV sensors, sensor data from one or more external sensors, other such capabilities information, or combination of two or more of such information. In some applications, the UAV database may further include tool system capabilities corresponding to the one or more tool systems cooperated with the UAV (e.g., tool system power levels, fill level of one or more reservoirs, types of one or more sensors on the tool system, other such information, or a combination of two or more of such information). The UAV control circuit and/or the central control system can be configured to access at least some of the UAV capability data and utilize this information in making decisions regarding current and subsequent tasks being or to be performed. In some instances, for example, the UAV capability data is utilized to select a set of one or more UAVs to complete a current task and/or at least initiate another task.

Some embodiments further include and/or have access to a tool system database configured to store tool system parameters associated with each of a plurality of tool systems. The tool system parameters can, at least part, define a function that is performed by a corresponding one of the plurality of tool system. The tool system database can further store operating parameters, operating capabilities information, historic information, real-time current information, tool system identifiers, tool system locations, tool system capabilities corresponding to the one or more tool systems cooperated with a UAV (e.g., tool system power levels, fill level of one or more reservoirs, types of one or more sensors on the tool system, other such information, or a combination of two or more of such information), other such information, or combination of such information. The UAV control circuit and/or central control system can access at least some of the tool system database in making decisions relative to one or more tool systems, such as selection of one or more tool systems to be cooperated with each of one or more UAVs to be used to implement the respective portions of one or more tasks.

Some embodiments further provide routing information to UAVs to implement one or more tasks. The central control system and/or one or more UAV control circuits can cause separate routing information to be communicated to each of one or more UAVs to be followed while implementing respective portions of one or more task. The routing can be based on the task to be performed, a geographic area or sub-area where a UAV is to implement a task, a current location of a UAV, a current location of a tool system to be used by a UAV, power level of a UAV and/or tool system, and/or other such information. In some embodiments, a UAV control circuit obtains sensor data and based on the sensor data identifies a geographic area to be covered to implement one or more determined tasks. A number of UAVs to be utilized can be identified to implement at least a portion of one or more of the tasks at the determined geographic location or sub-area of the geographic area. Timing information may also be identified, such as one or more threshold period of times in which one or more tasks are to be performed. Notifications can be communicated to each of a set of one or more UAVs to implement at least a portion of one or more tasks relative to the geographic location and/or one of the sub-areas.

Some embodiments further evaluate power levels of UAVs and/or tool systems in selecting, directing and/or coordinating UAVs and tool systems. In some implementations, a UAV control circuit may access power level data corresponding to each of multiple other UAVs and select one or more other UAVs from the multiple UAVs based at least in part on a power level of the one or more UAVs relative to one or more threshold power levels corresponding to task to be performed. Similarly, the central control system 102 may access the power level data and evaluate power levels of different UAVs and/or tool systems in selecting and/or issuing instructions to one or more UAVs. The power level data may be communicated by the UAVs and/or tool systems to the central control system, a mounting station, a power tracking system, or the like. In other embodiments, the power level information may be communicated by one or more UAVs and/or tool systems to other UAVs allowing UAVs to build local power level data. The communication of power levels may be based on a schedule, based on one or more thresholds being meet (e.g., stored power level drops below a power threshold), in response to an inquiry from another UAV or the central control system, other such events, or combination of two or more of such events.

As described above, in some embodiments, at least some tool systems may include internal power sources (e.g., one or more batteries, capacitors, other such electrical power storage devices, or combination of two or more of such devices). Further, in some implementations the power source may be a rechargeable power source. For example, the tool system may be recharged while cooperated with a mounting station. In some embodiments, power may additionally or alternatively supplied by the UAV to a tool system temporarily cooperated with the UAV. This power may be used to operate the tool system and/or recharge or partially recharge a rechargeable power source of the UAV. Additionally or alternatively, a UAV may draw power from a tool system to further support the operation of the UAV and/or extend an operating time of the UAV. In some embodiments, the UAV control circuit and/or a power management system 240 monitor power levels of one or more local rechargeable power sources 212 on the UAV, and power levels of one or more power sources of a tool system. Power flow can be controlled by the UAV control circuit depending on one or more thresholds, anticipated operating durations, external conditions, and/or other such information. Further, in some instances, the power management system, which in some implementations is in communication with the UAV control circuit and in other instances is implemented through the UAV control circuit, causes power to be drawn from and/or drained from one or more power sources 312 of a tool system and stored in the rechargeable power source 212 of the UAV. In some applications, the draining of the tool system power source is activated prior to the tool system being decoupled from the UAV. For example, the UAV may cause the power source 312 to be drained in response to completing a task using the tool system, while in other instances, the UAV control circuit and/or power management system initiates the draining of the power source 312 of the tool system upon approaching a mounting station and/or upon docking a tool system with a mounting station.

Some embodiments utilize multiple UAVs to cooperatively operate when a task or series of tasks are to be performed that may benefit by having multiple UAVs perform parts of the task or tasks. The multiple UAVs may cooperatively operate simultaneously in performing parts of the task. In other implementations, one or more of the UAVs may sequentially operation to cooperatively perform one or more tasks. In some embodiments, a UAV control circuit may evaluate data (e.g., sensor data, operating parameters, UAV parameters, tool system parameters, etc.) and identify a task to be cooperatively performed by multiple UAVs (e.g., the UAV performing the evaluation and one or more other UAVs). Sensor data may be obtained, and based on the sensor data a UAV control circuit may identify a geographic area within which a task is to be implemented. A set of UAVs can be identified to be cooperatively utilized to each implement a portion of the identified task at a respective sub-area of the geographic area within a threshold period of time. One or more notifications can be communicated to each of the set of UAVs to respectively implement at least a portion of the task relative to one of the sub-areas. A UAV control circuit may cause separate routing information to be communicated to each of the set of UAVs to be followed while implementing the respective portions of the task.

A UAV database may be maintained that stores UAV capability data defining operational capabilities of each of the multiple UAVs. This database may be maintained based on reporting statistics and/or operational parameters received from UAVs and/or tool systems. The data may be provided in response to an inquiry, based on threshold data and/or other such events. One or more UAV control circuits can access at least some of the UAV capability data and select, based on the UAV capability data corresponding to a set of UAVs, a set of two or more UAVs to cooperatively perform one or more tasks. Similarly, some embodiments additionally or alternatively maintain a tool system database storing tool system parameters associated with each of a plurality of tool systems and defining at least a function that is performed by a corresponding one of the plurality of tool systems. One or more UAV control circuits can access at least some of the tool system parameters to select, for each based on the tool system parameters, one or more tool systems that are to be cooperated with each UAV of a set of UAVs to be used by the set of UAVs to cooperatively implement respective portions of one or more tasks.

Some embodiments identify that multiple tool systems are to be used to implement a task, a set of interrelated or dependent tasks, or the like. A set of tool systems can be selected from multiple available tool systems. Similarly, a set of one or more UAVs can be selected to each temporarily cooperate with at least one of the multiple tool systems to be used in cooperatively performing the task or tasks. In some instances, one or more UAV control circuits may identify at least one UAV in each of multiple geographic areas and communicate instructions to each of the identified at least one UAV in each of multiple geographic areas directing each of the identified UAVs in each of multiple geographic areas to perform one or more tasks within a respective one of the multiple geographic areas.

In some embodiments, the computation process to determine one or more tasks to be performed, identify one or more UAVs to utilize, identify one or more tool systems to be utilized, routing, and/or other factors may be implemented through computational sharing across multiple UAV control circuits. Some embodiments cause data acquired through a set of one or more UAVs and/or tool systems can be accessed by UAV control circuits of one or more UAVs. Some of the data may be acquired while performing a set of at least one task. The data may be distributed to a set of two or more UAVs and/or two or more UAV control circuits are provided access to the acquired data. The multiple UAV control circuits can implement a cooperative computational processing of the data through the UAV control circuits and cooperatively identify based on the cooperative computational processing a set of at least one task to be performed, and identify a set of at least two tool systems to be utilized by a set of UAVs in cooperatively performing the set of tasks.

In some implementations, a UAV control circuit may be designated a primary control circuit and can issue instructions regarding the distribution of the computational processing. In other implementations, the central control system can direct the distribution of computation processing between multiple UAV control circuits. Further, parameter data may be accessed by the UAV control circuit to evaluate processing capabilities of other UAV control circuits of other UAVs, current processing being performed by other UAV control circuits of other UAVs, and other such parameters in selecting UAVs to be directed to perform some or all of the processing and/or determining how to distribute the cooperative computational processing. Further, one or more of the UAVs may be in operation performing one or more tasks, while in some implementations one or more or all of the UAVs performing the processing may be in an idle mode (e.g., docked at a mounting or docking station, recharging station, simply waiting to be put into action, and/or other such idle modes). In some embodiments, UAV control circuits communicate states and/or levels of processing. This reporting may be based on a schedule, based on a UAV control circuit reaching or maintaining a processing level greater than a processing threshold, in response to a request for reporting, and/or other such instances. The reporting may be directed to the central control system and/or a database, while in other instances the reporting may be directed to a particular UAV control circuit. In some implementations, however, the reporting may be relayed between UAV control circuits, allowing the information to be distributed over multiple if not all of the UAV control circuits within at least an operating set of multiple UAVs. Further, the mounting stations may comprise a mounting control circuit that can provide control over the mounting station (and tool systems cooperated with the mounting station). The mounting station control circuit may further be used as a resource in distributed computational processing. One or more UAVs and/or the central control system can direct instructions to a mounting station to utilize computational resources of the mounting station in evaluating and determining tasks to be performed, whether notifications should be distributed (e.g., conditions require immediate action and/or attention by a human), whether and what type of tool system to be used, and/or other such distributed processing.

Further, some embodiments distribute information, parameters, assignments, scheduling, routing and/or other information between multiple UAVs and/or tool systems. This can provide redundancy through the system as well as increase availability to information. One or more UAVs and/or tool systems can be configured to maintain a copy of information from one or more other UAVs and/or tool systems, providing a backup should one or more UAVs and/or tool systems fail, as well as further distributing the information and providing increased accessibility to that information. Additionally or alternatively, some embodiments utilize cloud based storage to distribute information, parameters, conditions, code, and/or other such information. In some embodiments, UAVs and/or tool systems can selectively clone its information and/or attributes to one or more other UAVs, tool systems, central control system, cloud based storage, and/or other such accessible memory. Some embodiments utilize one or more shared, distributed ledgers or blockchain data schemes to facility information distribution, authenticate the transfer of information, and/or track the distribution of information. The distributed ledger and/or blockchain data schemes can further limit or prevent unauthorized access and/or hacking of the UAVs, tool systems and/or other information.

In some embodiments, UAV control circuits of one or more UAVs may access computational processing capacity information associated with each of the multiple UAVs. The computational processing capacity may be maintained in a processing capacity database, provided in response to a request for current processing capacity, distributed based on a schedule, distributed in response to processing capacity exceeding or dropping below one or more thresholds and/or other such triggers. The one or more UAV control circuits may use the processing capacity information to identify a set of at least two UAVs to be utilized in performing the cooperative computational processing based on the computational processing capacity information associated with each of the set of the UAVs. The UAV control circuits in evaluating the computational processing capacity may identify UAV control circuits, mounting stations and/or the central control system having computational capacity that is greater than one or more capacity thresholds. The one or more thresholds may be dependent on an expected type of computational processing to be performed (e.g., evaluation of a first set of one or more types of sensor data may require more computational processing and database access than a second set of one or more types of sensor data, evaluation of multiple different types of sensor data be associated with other thresholds, thresholds based on a number of available resources (e.g., number of available UAVs in a given area over which a UAV is trying to make decisions, number of available tool systems, etc.), and other such considerations or factors).

As presented above, computational resources of multiple UAVs can be cooperatively utilized to evaluation data and information in determining tasks to be performed, selecting UAVs, selecting tool systems, scheduling tasks, routing UAVs and/or other such computational processing. Some embodiments additionally utilize other computational resources. For example, instructions can be communicated to a set of one or more mounting stations directing each of the first set of mounting stations to access data, such as data acquired through one or more UAVs and/or tool systems, and further direct the set of mounting stations to implement cooperatively computational processing of the data along with the UAV control circuits of a set of one or more UAVs in cooperatively identifying a set of one or more tasks to be performed, cooperatively identify a set of at least two tool systems to be used to implement at least part of a set of tasks, and/or other such processing. Additionally or alternatively, some embodiments, communicate instructions to a central control system directing the central control system to access the data acquired through one or more UAVs and/or tool systems, and to implement cooperatively computational processing of the data along with the UAV control circuits and/or a set of one or more mounting stations in cooperatively identifying one or more task to be performed, identify a set of tool systems, determine routing by UAVs to implement the one or more tasks, schedule the UAVs, and/or other such processing.

The distributed computational processing include the processing to identify UAVs and/or tool systems based on geographic areas where tasks are to be performed and locations of UAVs and tool systems. In some embodiments, a UAV control circuit identifies at least one UAV in each of multiple geographic areas. This may be in response to a query by the UAV control circuit, based on access to a location database, and/or other such information. Instructions in implementing the cooperative computational processing of data can be communicated to each of one or more identified UAVs in each of multiple geographic areas directing each of the identified at least one UAV in each of multiple geographic areas to perform at least a portion of the cooperative computational processing to identify at least UAV, of a set of multiple UAVs, that is associated with the respective one of the multiple geographic areas to be activated in cooperatively performing at least one task. Similarly, a UAV control circuit may identify at least one UAV in each of multiple geographic areas and communicate instructions, in implementing the cooperative computational processing of the data, to each identified UAV in each of multiple geographic areas directing each identified UAV in each of multiple geographic areas to perform at least a portion of the cooperative computational processing to identify at least one tool system, of a set of tool systems, that is associated with the respective one of the multiple geographic areas to be utilized in cooperatively performing at least one task.

One or more UAV control circuits may access power level data corresponding to each of multiple UAVs and/or tool systems, and select UAVs and/or tool systems to be utilized in cooperatively performing at least one task based at least in part on power levels of each of the multiple UAVs and/or tool systems relative to one or more threshold power levels corresponding to the task. In some embodiments, one or more UAV control circuits access a UAV database storing UAV processing capability data defining processing capabilities of each of the multiple UAVs, and select a set of at least two UAVs based on the processing capabilities of each of the set of at least two UAVs.

As described above, in some implementations, UAV control circuits identify one or more tasks that a UAV is to perform. The determination of a task to be performed may be based on a schedule, instructions from a central control system, instructions or request from another UAV, based on sensor information and/or parameter data acquired through the use of one or more tool systems, other such factors, or a combination of such factors. Similarly, a UAV may identify one or more types of tool systems 106 to be used in implementing the one or more tasks and/or be directed to utilize one or more types of tool systems. Based on the type of tool system, a UAV control circuit can in some implementations identify a specific tool system of the type that is available for use and/or that may be made available for use. Again, one or more factors can be considered in identifying or selecting a specific tool system to be used. Some of the parameters may include, but are not limited to, distance between the UAV and the tool systems, stored power levels on the tool systems, expected duration until a tool system is free for use, specific operating capabilities of the tool system (e.g., two tool systems may both be configured to detect soil moisture but using different types of soil moisture sensors), other such parameters, and typically a combination of two or more of such parameters.

In some embodiments, for example, a first UAV control circuit may be performing a task using a tool system, and may determine that the first UAV will be unable to complete the task. The first UAV may identify a second UAV and/or send out a broadcast to determine which UAVs may be available. The second UAV can be notified and directed to take over the task. Accordingly, the first and second UAVs can coordinate a handoff of the task to continue the task. In other instances, the task may be a scheduled prolonged task or a continuous task, and a second UAV can continue the task, and/or a tool system can be handed off between UAVs to perform the prolonged and/or continuous task.

In some embodiments, for example, a first UAV control circuit may identify a second UAV carrying a tool system that is configured to perform one or more functions that the first UAV control circuit has determined needs to be performed and/or is instructed to perform. Further, the first UAV may identify that the second UAV has finished using the tool system or receive communication of when the second UAV is expected to be finished with the tool system. The communication may be based on a query from the first UAV to the second UAV, based on scheduling through the central control system, based on status information accessible through one or more databased and/or distributed throughout multiple UAVs, and/or other such methods. In some instances, the first UAV control circuit may cause a notification to be communicated to the second UAV control circuit directing the second UAV to transfer the tool system to the first UAV. The transfer may be through a command and/or negotiation between the two UAVs directing the second UAV to dock the tool system at a selected mounting station (e.g., closest mounting station to the second UAV, mounting station that is about equidistant between UAVs, a selected mounting station based on a location of the task to be performed, a selected mounting station based on power levels of the two UAVs, and/or other such factors). In other instances, the transfer may be to merely direct the second UAV to deposit the tool system on the ground and direct the first UAV to subsequently cooperate with the released tool system. In yet other implementations, the tool system may be transferred while both UAVs are in flight (e.g., second UAV carrying the tool system underneath the substructural support 208 can cooperate the tool system with a universal coupler of the first UAV that enables coupling of a tool system on top of a substructural support; the first UAV may be configured to fly upside down for a period of time to cooperate with the tool system; etc.). Accordingly, the first UAV control circuit can direct the propulsion system of the first UAV to the location of the tool system and to position the first UAV to couple with the tool system being transferred from the second UAV.

In some embodiments, a UAV control circuit, in directing another UAV to transfer a tool system, may direct the other UAV to release the tool system at a location where a task is to be performed using the tool system. This can include directing the UAV to release the tool system on the ground, in a mounting station proximate the area where the task is to be performed, placing the tool system and a predefined landing area or other predefined deposit area, or the like. Similarly, some embodiments direct a second UAV to hover at a defined location and altitude. A first UAV can direct its propulsion system to cause the first UAV to position the first UAV adjacent the second UAV and couple with the tool system cooperated with the second UAV while the first UAV and the second UAV are in flight.

The determination that a tool system is to be handed off between UAVs may be based on one or more factors. In some embodiments, for example, a UAV control circuit may identify a task being performed by another UAV using a first tool system is to continue to be performed and/or is to continuously be performed. The UAV control circuit can direct its propulsion system to couple with the first tool system and continue implementing the task using the first tool system. Further, some embodiments identify a power level of a first UAV is less than a threshold power level. A notification can be communicated to the first UAV directing the first UAV to transfer the tool system based on the power level of the first UAV being less than the threshold power level. Similarly, some embodiments evaluate a power level of a tool system to confirm that there is sufficient power in the tool system to continue being used to perform a task. Accordingly, some embodiments confirm a power level of a tool system is greater than a tool system power level threshold prior to causing the notification to be communicated to a UAV directing the UAV to transfer the tool system.

Some embodiments evaluate location data of a tool system and/or UAVs prior to initiating a transfer in attempts to reduce delay, reduce power drain due to at least extended travel, and/or other such factors. A tool system database may be maintained storing tool system parameter data associated with each of multiple tool systems. The database may, in part, define functional capabilities and current location of each of the multiple tool systems. UAV control circuits can be configured to access the tool system database, identify one or more tool systems has a functionality to be used to perform a task, and identify that at least one of the one or more tool systems is within a threshold distance of the UAV that is to temporarily couple with the intended tool system. In some embodiments, tasks may have time restrictions. As such, tool systems may be transferred in attempts to complete tasks within threshold time limits. A UAV control circuit may identify that a second UAV is predicted to complete a first task being performed using the first tool system within a threshold period of time.

Other triggers and/or conditions can be detected to cause a transfer of one or more tool systems. Some embodiments, for example, can initiate a transfer of a tool system based on tool conditions, which may be projected (e.g., based on the task being performed, time spent performing the task, predicted remaining time to complete the task, type of tool parts, etc.) and/or measured. Similarly, the transfer of a tool system may be based on a knowledge of schedule tasks performed since last maintenance and projection or future wear rates for tasks planned. Historic tools experience wear and tear, maintenance, cleaning, charging, re-filling, sharpening, etc. can be considered. In some instances, a tool system hand-off may be initiated based on detectable and/or observable characteristics.

Some embodiments evaluate the conditions of tool systems in determining whether to initiate a tool system transfer. Measured and/or predicted conditions and observations about tool system conditions can be made from one or more sensor inputs, from integrated system performance monitoring (e.g., such as a force or time needed to perform a task increases with wear), and/or other such conditions. For example, a tool system control circuit, a UAV control circuit and/or the central control system may track progress of a tool system performing a task and evaluate progress based on one or more thresholds (e.g., cutting with a dull blade takes longer, increased pressure is needed, etc.) which are often detectable and/or observable. Other detectable characteristics can be used depending on the specifics of the tool system (e.g., low tank when the tool system includes a tank carrying a chemical or other substance), change in weight when dispensing or collecting, etc.).

Some embodiments in selecting UAVs to perform a task and/or selecting a tool system to be used may further consider power levels of UAVs and/or tool systems. Further, some embodiments attempt to balance power utilization between UAVs and/or tool systems. In some embodiments, a UAV control circuit of a UAV and/or the central control system may access power level data corresponding to each of multiple different UAVs of a task coordination system 100. The power level data may be received from UAVs and/or tool systems based on a schedule, based on a notification in response to a power level dropping below each of one or more thresholds, based on a request communicated to UAVs and/or tool systems from a requesting UAV control circuit and/or central control system, or the like. For example, a UAV control circuit may cause one or more power level polling requests to be communicated and/or broadcasted to multiple UAVs and/or tool systems, and receive power level information based on the polling request. One or more power databases may be maintained, for example by the central control system, that includes power level data associated with multiple UAVs and/or tool systems. UAVs and/or tool systems may communicate power level data to the central control systems, which can update power levels in the power database. As described above, the power level data may be communicated based on a schedule, thresholds and/or other such conditions or events. UAV control circuits and/or the central control system can access power level information from the power database in evaluating UAVs and/or tool systems.

In some embodiments, power demands and/or expected power usage to perform a task can be determined and/or accessed. For example, a task to be performed and a corresponding tool system to be used in performing the task can be identified. A predicted power usage can be determined based on the task to be performed, an area to be traveled to cooperate with a tool system and performing the task can be predicted, parameters can be considered (e.g., wind speed, temperature, humidity, aerial and/or ground traffic in or within threshold distance of an area where task is to be performed, presence of humans, and/or other such parameters), and/or other such factors can be considered. Based on expected power usage information and the power level data of UAVs and/or tool systems, one or more other UAVs can be selected based at least in part on a power level of the one or more other UAVs relative to one or more threshold power levels corresponding to a task to be performed and a predicted power usage of the UAV and/or one or more tool systems to be temporarily cooperated with the one or more UAVs to be used in performing the task. Further, some embodiments may use multiple UAVs in performing a set of different tasks and rotate the multiple UAVs between the different tasks to balance power usage. This may include switching between different tool systems to perform the different tasks. Further, the balancing of power may include switching between different UAVs while allowing UAVs to recharge before switching back into a rotation of multiple UAVs directed to perform one or more tasks.

Some embodiments include a power level database maintaining power level data of each of the multiple UAVs and/or tool systems that can be accessed by UAV control circuits. Additionally or alternatively, some embodiments may include a task predicted power usage database associating for each of the multiple UAVs predicted power usage data corresponding one of the UAVs to carry at least a selected one of multiple tool systems to perform at least one of multiple different tasks. UAV control circuits can access the task predicted power usage database to identify a predicted amount of power to be utilized by each of at multiple UAVs to perform a task. Further, a UAV control circuit may access the power level database, and evaluate the power level data indicating a current power level of each of multiple UAVs relative to the predicted amount of power to be utilized by the corresponding UAV.

In some embodiments, a UAV control circuit is configured to determine a predicted amount of power that a second UAV is predicted to utilize to carry a first tool system to perform a task. In some instances, the prediction of power usage may include identifying a predicted distance of travel by the UAV in performing the task. Similarly, some embodiments access predicted power usage by two or more of multiple tool systems to perform a task, and select a tool system of the multiple tool systems based at least in part on a power level of the tool system relative to a tool system threshold power level corresponding to the task to be performed and a predicted power usage by the tool system in performing the task. The predicted power usage may be based on specifications of the UAVs and/or tool systems, based on historic data corresponding to the same or similar UAV and/or tool system being used to perform the same or similar tasks, and/or other such information. For example, in some embodiments UAV control circuits cause power levels and/or usage data to be communicated to the central control system that can maintain a power level data. Using this information the central control circuit can determine power usage relative to various factors (e.g., type of UAV, type of tool system used, number and/or type of tool systems cooperated with a UAV, tool system parameters (e.g., size, weight, wind drag, etc., quantity of chemical carried), type of task performed, duration of performing the task, other such factors, or combination of two or more of such factors). Further, one or more thresholds may be associated with data. For example, some data may not be considered unless one or more thresholds are met (e.g., threshold change in power level, threshold duration of operation, etc.).

One or more UAV control circuits may be configured to direct a cooperative operation of each of the multiple UAVs in performing a set of different tasks and rotate the two or more of the multiple UAVs between the different tasks to balance power usage between the multiple UAVs. For example, a first tool system may be relatively heavy comparted to one or more other tool systems. Accordingly, multiple UAVs may be directed to switch tool systems while performing one or more tasks to balance power usage by the UAVs and/or provide an extended performance of the one or more tasks. Similarly, a tool system may draw power from a UAV. Accordingly, multiple UAVs may be directed to switch tool systems. In some applications, different tasks may result in greater power drains. For example, some tasks may take longer to perform. Accordingly, multiple UAVs may be cooperatively directed to perform a task in attempts to balance power usage.

In some embodiments, the central control system evaluates power level usage relative to historic power level usage information in evaluating an efficiency of operation of the multiple UAVs, evaluate UAVs performance and/or potential need for maintenance, track deteriorating performance of a UAV and/or tool system in adjusting expected power usage for that UAV and/or tool system, and/or other such considerations. Further, in some instances, power management can direct a UAV to drain power from a power source of a tool system cooperated with the UAV and be stored in a power source of the UAV prior to the UAV disengaging from the tool system. Some embodiments further identify one or more sensor systems and/or tool systems that are not currently and/or predicted to be needed, and direct the UAV to power down those systems, and where relevant to decouple from those systems. The decoupling may result in reduced weight and thus provide greater expected efficiency and/or increase operational time.

The predicted power usage may be based on historic information using power usage data obtained when one or more UAVs and/or tool systems were used to perform the same or similar tasks, considering effects of similar parameters (e.g., similar wind speeds, expected aerial and/or ground traffic, etc.), consideration of power usage when performing the same or different tasks over similar amounts of areas to be traversed, and/or other such information. Some embodiments further maintain or store power level usage over time of the selected one or more UAVs and/or tool systems to be utilized in subsequent power balance analysis. Still further, some embodiments may evaluate power usage relative to historic power level usage information in evaluating the efficiency of operation of one or more UAVs and/or tool systems, evaluate UAVs performance and/or potential need for maintenance, track deteriorating performance of a UAV and/or tool system in adjusting expected power usage for that UAV and/or tool system, and/or other such considerations. For example, the central control system and/or a UAV control circuit may identify that a quantity of power usage to perform one or more tasks exceeds a threshold and direct that maintenance be performed on the UAV and/or tool system (e.g., replace a rechargeable power source, perform a cleaning, perform a sharpening of parts of a tool system, etc.).

Further, some embodiments maintain and provide access to one or more shared, distributed ledgers or blockchain data schemes. Information acquired through one or more UAVs and/or tool systems may be communicated using chained blocks and a distributed ledger kept regarding the communications. The distributed ledger can be replicated among multiple communication systems and/or devices (e.g., UAVs, tool systems, mounting stations, docking stations, central control system, and/or other such communication systems). Some or all of the distributed ledger may be a private, while some or all of the distributed ledger may be a public scheme. The ledger entries blocks may apply a proof-of-work, proof-of-stake, proof-of-space, and/or other such authentication to achieve distributed consensus. The private ledgers may apply restricted access to authorized systems or devices. The ledger can provide access to information (e.g., sensor information, scheduling, operating status information (e.g., power levels, tool systems in use, estimated percentage of a task completed, etc.), available and in use UAVs and tool systems information, location information of UAVs and tool systems, mounting station locations, availability to receive tool systems at mounting stations, history of completed tasks, history of user inputs, history of user requests, history of UAVs operations, history of tool system operations, other such information, and typically a combination of two or more of such information). Further, the ledger information can be accessed by multiple systems of the task coordination system 100. In some instances, information from a UAV and/or tool system is uploaded in a batch when returned to a mounting station and/or docking station.

The tool systems, as described above, enable the task coordination system 100 to utilize UAVs to perform multiple different tasks. The UAVs do not have to be built to perform specific tasks, but instead can be assembled with one or more couplers and/or the universal coupler to enable the different UAVs to releasably cooperate with one or more tool systems that can be carried by the UAVs to a location where the tool systems are to be utilized. In some instances, for example, one or more tool systems can be utilized to track crops over one or more areas. The crop tracking and/or monitoring can be through image and/or video processing, image comparisons between images captured at different times, pest detection, soil sampling, crop ripeness evaluation (e.g., through light and/or optical processing), and/or other such monitoring.

In some embodiments, one or more tool systems can be configured to detect RFID tags, watermarks and/or other such distinguishing marks or identifiers. Workers and/or one or more tool systems can be utilized to tag test crops, such as with RFID tags, watermarking, or other such tagging. UAVs can carry appropriate tool systems over relevant areas to detect the tagged crops and monitor test crops and/or one or more test plants within a test crop, for any number of parameters such as, for example, fruit development, sugar content of fruit, ripening of fruit, insect resistance, moisture levels, and/or others such parameters. Such parameters may be determined based on video sampling, moisture sampling, fruit sampling and testing at a site, and other such information acquisition. One or more tool systems may be utilized to capture information to enable evaluation of one or more of these parameters. Accordingly, the task coordination system allows remote monitoring of crops, plants, test crops, test plants, infestations, soil conditions, weather, and other items, conditions, projects and the like.

Some tool systems may be configured to support and/or assist other tool systems. For example, some tool systems may provide replacement components, retrieve samples taken by another tool system, transport a payload to or from another tool system, and/or provide other services to a tool system. As further examples, an assistant tool system may carrying a replacement bulb for a lighting tool system, an assistant tool system may replace a drill bit or saw of a drilling or sawing tool system, an assistant may supply one or more additional sensors to be placed by another drown, an assistant tool system may provide additional treatment chemicals or materials, an assistant tool system may transport one or more additional treatment containers and/or retrieve one or more treatment containers with samples from a sampling tool system, and/or other such assistance functions.

Figure 6:
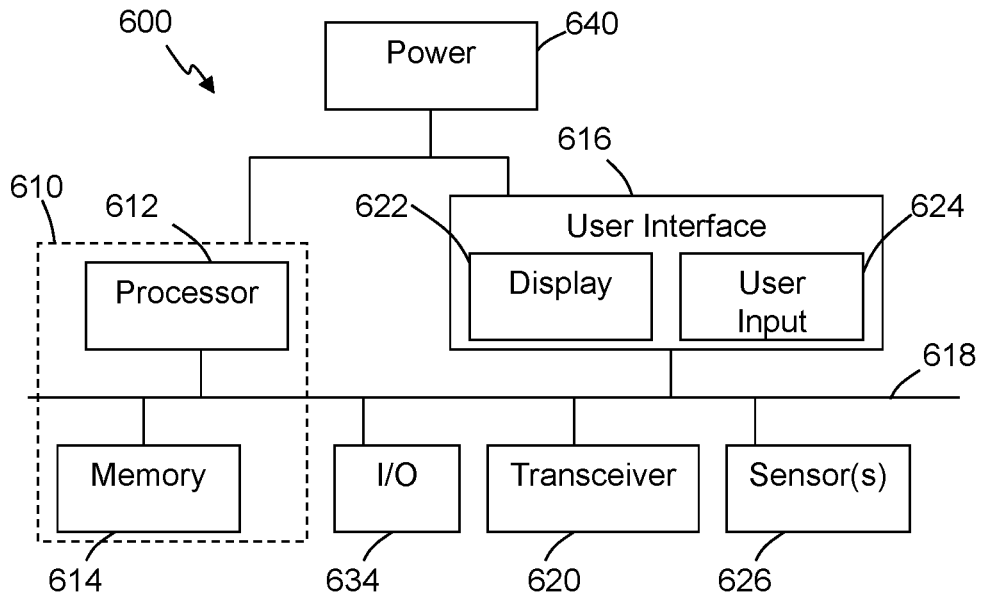
FIG. 6 illustrates an exemplary system for use in implementing methods, techniques, devices, apparatuses, systems, servers, and sources enabling unmanned vehicle task coordination, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the above or below mentioned circuitry, systems or devices, or parts of such circuits, circuitry, functionality, systems, apparatuses, processes, or devices. For example, the system 600 may be used to implement some or all of central control system 102, UAVs 104, tool systems 106, mounting stations 114, service requestors 122, UAV control circuits 202, tool system control circuits 302, and/or other such components, circuitry, functionality and/or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system may implement the central control system 102 with the control circuit being a central system control circuit, a UAV 104 with the UAV control circuit 202, a tool system 106 with a tool system control circuit 302, or other components.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or wired and/or wireless communication network 108 (e.g., a local area network (LAN), the Internet, wide area network (WAN), etc.), communication link 618, other networks or communication channels with other devices and/or other such communications or combination of two or more of such communication methods. Further the transceiver 620 or multiple transceivers can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the tool system control circuit, UAV control circuit, central control system, etc. The sensors can include substantially any relevant sensor, such as distance measurement sensors (e.g., optical units, sound/ultrasound units, etc.), motion sensors, inertial sensors, location sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Figure 7:
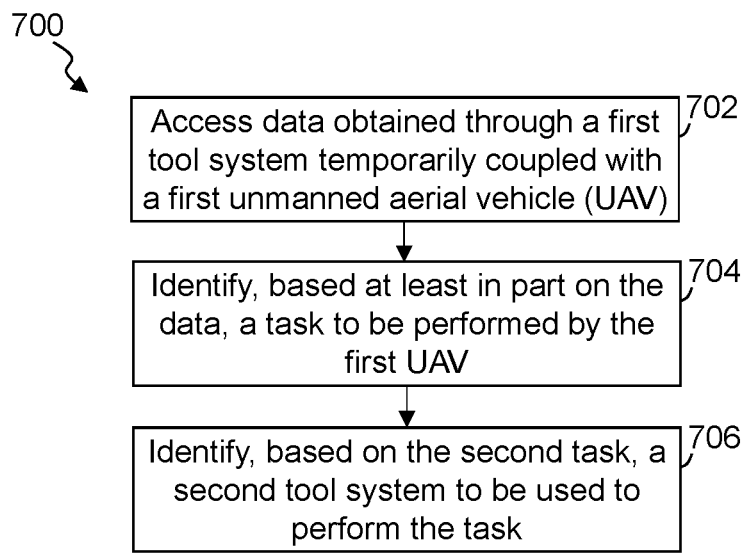
FIG. 7 illustrates a simplified flow diagram of an exemplary process of performing tasks through multiple UAVs, in accordance with some embodiments.

FIG. 7 illustrates a simplified flow diagram of an exemplary process 700 of performing tasks through multiple UAVs, in accordance with some embodiments. In step 702, a UAV control circuit implements an instruction to temporarily couple with a tool system 106 of multiple different tool systems that are each configured to perform a different function to be put into use while or after being carried by one of the plurality of UAVs. For example, a tool system may comprise a package securing tool system configured to retain and enable transport of a package while being delivered, a sensor tool system configured to sense a condition and communicate sensor data of the sensed condition to the UAV control circuit, a lighting tool system, one or more cameras, motion sensors, other such functions, or combination of two or more of such functions.

In step 704, a propulsion system of the UAV is controlled to align a universal coupler 214 of the UAV with a tool system. As described above, the universal coupler is configured to interchangeably couple with and decouple from one of multiple different tool systems. In step 706, a coupling system of the universal coupler is caused to securely couple with the tool system, and enables a communication connection between a communication bus 220 of the universal coupler and the tool system 106.

Some embodiments, in aligning the universal coupler with the tool system, further control the movement of the UAV such that a first set of permanent magnets 406 of the UAV are in a threshold distance of a second set of permanent magnets 408 of the tool system and enable a magnetic interaction between the first set of permanent magnets and the second set of permanent magnets. In some embodiments, the UAV and/or the tool system may include one or more sets of electromagnets. A decoupling can be implemented between the UAV and the tool system by activating one or more sets of electromagnets. In some instances, one or more electromagnets may be positioned relative to one or more sets of permanent magnets and activated in part to overcome a magnetic force relative to at least the permanent magnet.

Further, the aligning of the universal coupler with a tool system may include engaging an alignment structure of the UAV and/or universal coupler with at least an alignment structure of the tool system as at least one of the tool system and the UAV are moved, and enabling a coupling to be implemented between the UAV and the tool system. The engagement between the alignment structure of the UAV and/or universal coupler with the alignment structure of the tool system can include causing one or more generally cone shaped cavities of the alignment structure of the UAV and/or universal coupler to align with and/or engage one or more generally cone shaped protrusions of the alignment structure of the tool system, and/or one or more cone shaped cavities of the tool system with one or more cone shaped protrusions of the universal coupler. Other embodiments may additionally or alternatively use different shaped cavities and protrusions to aid in aligning the tool system and the universal coupler such as but not limited to dome shaped, pyramid shaped, and/or other such shapes. Some embodiments may further induce air flow, suction, and/or other methods to assist in alignment.

A coupling system of a universal coupler may include a gripping system that can be activated to grip a grip feature of the tool system. Some embodiments securely couple the coupling system with the tool system by extending the gripping system of the UAV and/or the universal coupler to a position to grip the grip feature. The gripping system may, in some instances, be retracted to secure the tool system with the universal coupler. In securing the coupling system, some embodiments cause one or more extensions of the UAV, universal coupler and/or tool system to engage a recess formed in a surface of a mating protrusion of the tool system, or universal coupler. The extension may assist in aligning and inhibiting rotation of the tool system while the gripping system is retracted a threshold distance.

The alignment between the universal coupler and a tool may include causing one or more alignment structures of the UAV to engage with one or more alignment structures of a mounting station of multiple mounting stations. At least some of the mounting stations are typically configured to support and align at least one tool system as one of a UAV and a mounting station are moved to cause the engagement between the alignment structures of the UAV and tool system to align the tool system enabling secure coupling between the UAV and the tool system. In some embodiments, universal couplers can be configured to coupler to one or more other universal couplers. Some embodiments control the propulsion system of a first UAV and align a first universal coupler of the first UAV with a universal coupler of a second UAV, and cause a coupling system of the first universal coupler to securely couple with the universal coupler of the second universal coupler to maintain a position of the first UAV relative to the second UAV while the first UAV and second UAV are in motion and while at least one or more tool systems are active.

Figure 8:
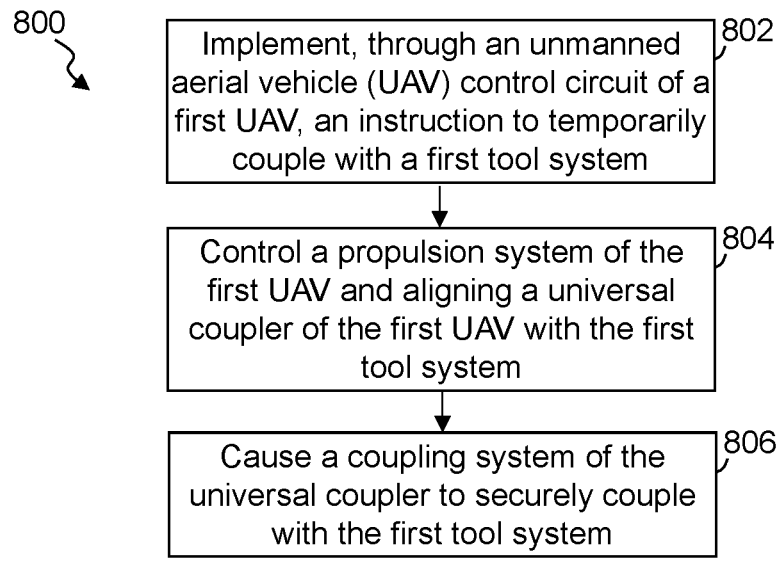
FIG. 8 illustrates a simplified flow diagram of an exemplary process of performing tasks through multiple UAVs, in accordance with some embodiments.

FIG. 8 illustrates a simplified flow diagram of an exemplary process 800 of performing tasks through multiple UAVs, in accordance with some embodiments. In step 802, data obtained through a first tool system temporarily coupled with a universal coupler of a UAV, while performing a first task using the first tool system, is accessed and/or obtain by the UAV control circuit. In step 804, one or more other tasks are identified, through the UAV control circuit and based at least in part on the accessed data, that is to be performed by the UAV. In step 806, one or more tool systems are identified, through the UAV control circuit and based on the second task to be performed, that are to be used to perform the second task. Some embodiments in accessing the data receive sensor data from the first tool system obtained while performing the first task. The one or more other tasks to be performed and the one or more tool systems to be used may be identified based on the sensor data received through the first tool system.

In some embodiments, a decoupling of the first tool system from a universal coupler of the UAV is caused. The decoupling may be activated by the UAV control circuit. In some instances, the first tool system may be secured with the universal coupler through one or more couplers that may be activated and deactivated. For example, retractable pins may be retracted, a lever arm may be rotated, one or more electromagnets may be activated or deactivated, other such decoupling, or combination of two or more of such decoupling may be implemented. The coupling of a second tool system can be directed with the first universal coupler following the decoupling of the first tool system.

Some embodiments control a propulsion system of the first UAV directing the first UAV to a first mounting station. The second tool system is temporarily coupled with a first universal coupler of the first UAV. The propulsion system can further be controlled to direct the first UAV to a task location and activating the second tool system in performing the second task. In other instances, a second UAV temporarily coupled with the second tool system may be identified, and the propulsion system of the first UAV can be controlled to retrieve the second tool system from the second UAV.

In some instances, the UAV control circuit of the first UAV can identify one or more other UAVs that are to be used to perform at least a portion of the second task. A notification can be caused to be communicated to the one or more other UAVs directing the one or more other UAVs to perform at least the portion of the second task in cooperation with the first UAV. This can allow a team of UAVs to cooperatively perform one or more tasks. Some embodiments control a propulsion system of the first UAV to cause the first UAV to temporarily cooperate with a universal coupler of a second UAV while perform at least the portion of a task. In some embodiments, the UAV control circuit of the first UAV accesses power level data corresponding to each of multiple other UAVs, and selects one or more other UAVs from the multiple UAVs based at least in part on a power level of the one or more other UAVs relative to a threshold power level corresponding to the second task. The UAV control circuit of the first UAV can initiate a direct communication with the second UAV to coordinate the operation of both the first UAV and the second UAV in performing at least a portion of one or more tasks. In some instances, power can be drained from a power source of the first tool system and stored in a power source of the first UAV prior to the first tool system being decoupled from the first UAV.

Figure 9:
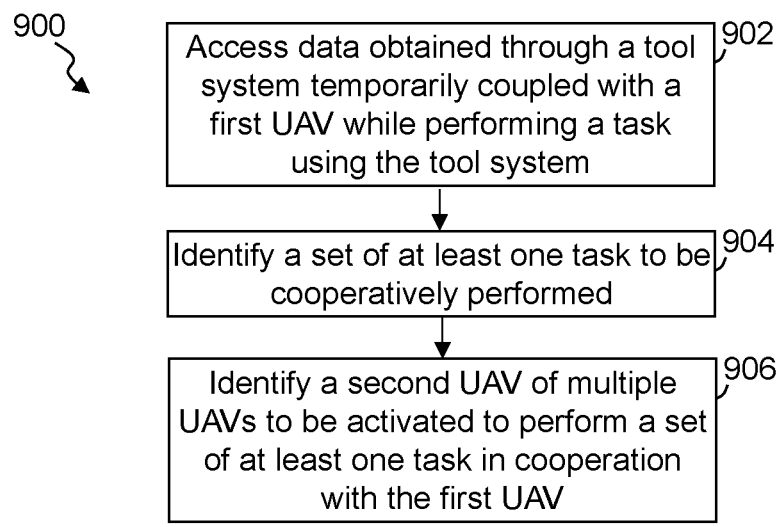
FIG. 9 illustrates a simplified flow diagram of an exemplary process of managing tasks through the cooperative operation of multiple UAVs, in accordance with some embodiments.

FIG. 9 illustrates a simplified flow diagram of an exemplary process 900 of managing tasks through the cooperative operation of multiple UAVs, in accordance with some embodiments. In step 902, data is accessed that is obtained through one or more tool systems temporarily coupled with one or more UAVs while performing one or more tasks using the one or more tool systems. In step 904 a set of at least one task is identified that is to be cooperatively performed by a set of multiple UAVs. In some instances, a UAV control circuit can evaluate the accessed and based at least in part on the data identify the set of at least one task to be cooperatively performed by the set of UAVs. In step 906, one or more UAVs of multiple UAVs are identified that are to be activated to perform the set of at least one task in cooperation with a first UAV.

The cooperative operation of UAVs may, in some instances, be based at least in part on geographic areas. Sensor data may be accessed, and based on the sensor data one or more geographic areas can be identified within which a set of at least one task is to be implemented. A set of UAVs can be identified to be cooperatively utilized to each implement a portion of the set of at least one task at a respective sub-area of the geographic area within a threshold period of time. The set of UAVs may be identified based on their current location being within a threshold distance of a geographic area, or sub-area. In other instances, UAVs may be selected to route to different areas or sub-areas based on tool systems cooperated with UAVs and/or tool systems within threshold distances of the UAVs. Notifications can be communicated to each of the set of UAVs to respectively implement at least a portion of the set of at least one task relative to one of the sub-areas. Further, some embodiments cause separate routing information to be communicated to each of the UAVs to be followed to get to an area or sub-area, and/or to be followed while implementing the respective portions of the set of at least one task.

Some embodiments maintain UAV capability data in a UAV database that stores and defines operational capabilities of each of multiple UAVs. Multiple UAVs may be selected, based on the UAV capability data corresponding to a set of UAVs, to cooperatively perform a set of at least one task. Similarly, some embodiments maintain tool system parameters in a tool system database associating storing tool system parameters with each of a plurality of tool systems and defining at least one or more functions that are performed by a corresponding one of the plurality of tool systems. The operational capabilities may further define operating durations, power level capacity, current power levels, specifications, levels of performance, efficient information, current location information, and/or other such information. The tool system database may be access and a tool system may be selected, based on the tool system parameters for each of the multiple selected UAVs, that is to be cooperated with one of the multiple UAVs to be used to implement respective portions of the set of at least one task.

Some embodiments identify that multiple tool systems are to be used to implement the set of at least one task, and can select from multiple available tool systems a set of two or more tool systems to be utilized. Similarly, a first set of UAVs may be selected, from multiple UAVs, that are to each to temporarily cooperate with at least one of the selected tool systems to be used in cooperatively performing the set of at least one task. Geographic information may further be taken into consideration in selecting UAVs and/or tool systems. In some applications, at least one UAV is identified in each of multiple geographic areas. Instructions can be communicated to each of the identified UAVs in each of multiple geographic areas directing each of the identified UAVs in each of multiple geographic areas to perform a set one or more tasks within a respective one of the multiple geographic areas.

Figure 10:
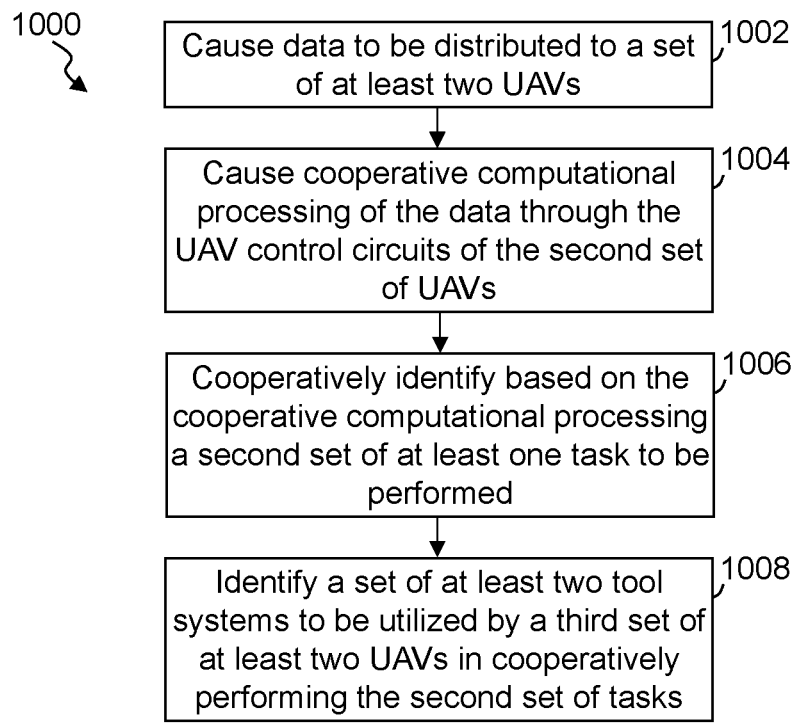
FIG. 10 illustrates a simplified flow diagram of an exemplary process of performing distributed computational processing across multiple UAVs, in accordance with some embodiments.

FIG. 10 illustrates a simplified flow diagram of an exemplary process 1000 of performing distributed computational processing across multiple UAVs, in accordance with some embodiments. In step 1002, data acquired through at least a first set of at least one UAV while performing a first set of one or more tasks is distributed to a second set of at least two UAVs. In step 1004, cooperative computational processing of the data is implemented through UAV control circuits of the second set of UAVs. In step 1006, second set of one or more tasks that are to be performed are identified based on the cooperative computational processing. In step 1008, a set of at least two tool systems are identified that are to be utilized by a third set of at least two UAVs in cooperatively performing the second set of tasks.

Computational processing capacity information can be accessed that is associated with each of multiple UAVs. A set of UAVs can be identified to be utilized in performing the cooperative computational processing based on the computational processing capacity information associated with each of the second set of the at least two UAVs. Some embodiments maintain a UAV database and/or a computational processing database that can maintain current information regarding processing total potential capabilities, currently utilized processing capability bandwidth (which may be based on an average processor usage and/or historic usage over a period of time, scheduled processing, predicted processing, and/or other such information), tool system processor demands, sensor data processing demands, and/or other such processing. Mounting stations may additionally or alternatively be used in computational sharing. In some instances, instructions can be communicated to a set of one or more mounting stations directing each of the set of mounting stations to access at least data acquired through a set one or more UAVs. The instructions cause the cooperatively computational processing of the data by the set of mounting stations, which may be along with processing by one or more UAV control circuits of a set of UAVs in cooperatively identifying a set one or more tasks to be performed and a corresponding set of tool systems to be utilized in implementing one or more identified tasks. Some embodiments communicate instructions to the central control system directing the central control system to access the data acquired through at least the first set of at least one UAV, and causing the cooperatively computational processing of the data by the central control system along with the UAV control circuits of the set of UAVs and/or the set of mounting stations in cooperatively identifying the set of task to be performed and the set of tool systems.

The cooperative computational processing may be distributing in part based on geographic areas. One or more UAVs may be identified in each of multiple geographic areas. Instructions can be communicated to each of the identified UAVs in each of multiple geographic areas directing the UAVs in each of multiple geographic areas to perform at least a portion of the cooperative computational processing to identify at least one UAV, of a set of multiple UAVs, that is associated with the respective one of the multiple geographic areas to be activated in cooperatively performing a set of tasks. Similarly, some embodiments identifying one or more UAVs in each of multiple geographic areas, and communicate instructions to each of the identified UAVs directing each of the UAVs in each of multiple geographic areas to perform at least a portion of the cooperative computational processing to identify at least one tool system, of a set of tool systems, that is associated with the respective one of the multiple geographic areas to be utilized in cooperatively performing a set of one or more tasks. Further, some embodiments in causing the cooperative computational processing cause a UAV control circuit of each of the set of UAVs to access power level data corresponding to each of multiple other UAVs, to select at least one tool system of the set of tool systems and selecting at least one UAV to be utilized in cooperatively performing one or more tasks based at least in part on power levels of each of the multiple other UAVs relative to one or more threshold power level corresponding to at least one of the tasks. One or more UAV databases and/or processing capabilities databases may be maintained and accessed that store UAV processing capability data defining processing capabilities of each of the multiple UAVs. A set of UAVs may be selected based on the processing capabilities of each of the UAVs.

Figure 11:
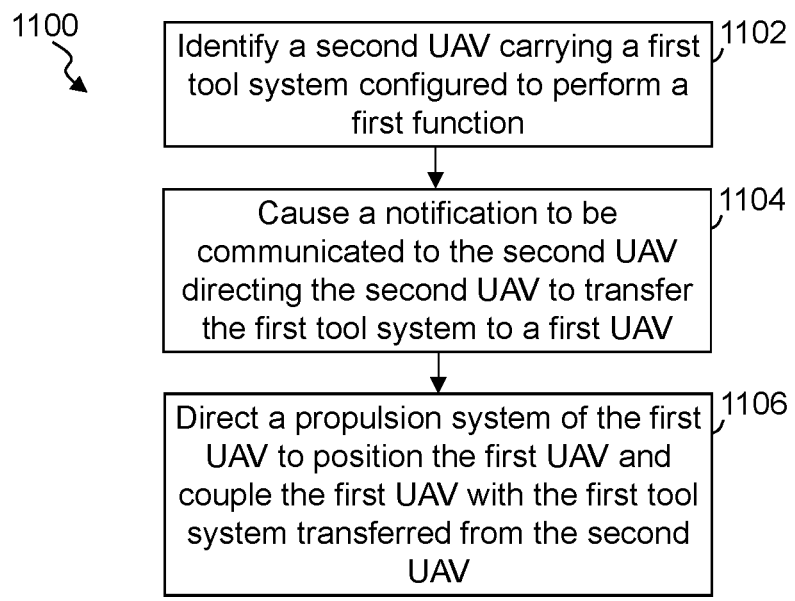
FIG. 11 illustrates a simplified flow diagram of an exemplary process of enabling the handoff of tool systems between UAVs, in accordance with some embodiments.

FIG. 11 illustrates a simplified flow diagram of an exemplary process 1100 of enabling the handoff of tool systems between UAVs, in accordance with some embodiments. In step 1102, a first UAV carrying a tool system configured to perform a first function is identified. In some instances, the first UAV is identified through the central control system. In other instances, the first UAV is identified through a second UAV control circuit of a second UAV of multiple different UAVs of a task system 100. In step 1104, a notification is communicated to the first UAV directing the first UAV to transfer the tool system to the second UAV. In step 1106, a propulsion system of the second UAV is directed to control the second UAV to position the second UAV and couple the second UAV with the tool system transferred from the second UAV. In some instances, the first UAV is directed to disengage from the tool system and leave the tool system on the ground, in a mounting station, or other location. The second UAV can proceed to the location of the tool system and couple with and secure the tool system with the second UAV. In other instances, the first and second UAVs can communicate and coordinate the exchange of the tool system while both UAVs are in flight (e.g., while hoovering). In some applications, a first UAV can be directed to release a tool system at a location where a task is to be performed using the tool system.

Some embodiments in directing a UVA to transfer a tool system direct a second UAV to hover at a defined location (e.g., GPS coordinates, mapping coordinates, etc.) and altitude, and direct a first UAV to control its propulsion system to position the first UAV adjacent the second UAV and cause a coupling of the first UAV with the tool system while the first UAV and the second UAV are in flight. The direction of the transfer of a tool system may include identifying a task being performed by a first UAV using a tool system is to continue to be performed. A second UAV can be directed to control its propulsion system to couple with the tool system and continue implementing the task using the tool system. This can allow the task to continue, such as when the first UAV is running out of power. In some instances, a power level of a first UAV can be identified as being less than a threshold power level. A notification can be communicated to the first UAV directing the first UAV to transfer the tool system based on the power level of the first UAV being less than the threshold power level. Similarly, some embodiments confirm a power level of a tool system is greater than a tool system power level threshold prior to causing a notification to be communicated to a UAV directing the UAV to transfer the tool system. Further, some embodiments accessing a tool system database storing tool system parameter data associated with each of multiple tool systems defining functional capabilities and current location of each of the multiple tool systems, and can identify a tool system has a functionality to be used to perform a task and further identify that the tool system is within a threshold distance of a UAV to be transferred to the tool system, and/or within a threshold distance of a geographic area where a task is to be performed using the tool system. Some embodiments identify that a first UAV is predicted to complete a task being performed using the tool system within a threshold period of time prior to directing the transfer. This can ensure that a subsequent UAV to be transferred to tool system can perform a subsequent task or continue the task within a desired time frame.

Further, some embodiments evaluate power levels of UAVs and/or tool system in selecting one or more UAVs and/or one or more tool systems to be used in performing one or more tasks. The central control system and/or a UAV control circuit can access power level data corresponding to each of the multiple UAVs and/or multiple tool systems. The central control system and/or UAV control circuit can evaluate the accessed power level data, and select a second UAV of multiple UAVs and/or a tool system based at least in part on a power level of the second UAV relative to a threshold power level. In some instances, the threshold power level corresponds to a first task to be performed, a predicted power usage of a tool system to be temporarily cooperated with the second UAV and to be used in performing the first task, a safety margin power level of a UAV, other such factors, or combination of two or more of such factors.

Figure 12:
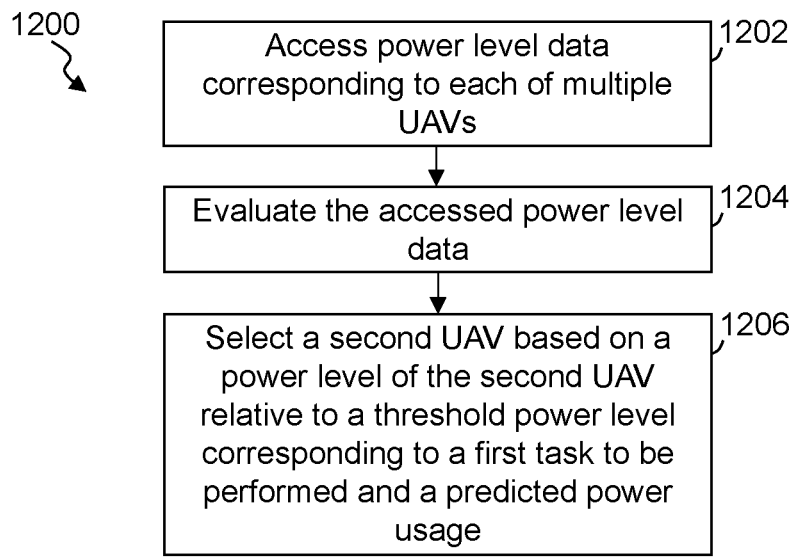
FIG. 12 illustrates a simplified flow diagram of an exemplary process of balancing power while managing UAVs in the performance of tasks, in accordance with some embodiments.

FIG. 12 illustrates a simplified flow diagram of an exemplary process 1200 of balancing power while managing UAVs in the performance of tasks, in accordance with some embodiments. In step 1202, power level data is accessed by a first UAV control circuit of a first UAV of the multiple UAVs. The power level data can correspond to each of the multiple UAVs, and typically a current remaining power level data. In step 1204, the accessed power level data is evaluated, typically relative to one or more tasks to be performed. In step 1206, at least a second UAV is selected from the multiple UAVs based at least in part on a power level of the second UAV relative to a threshold power level corresponding to a first task to be performed and a predicted power usage of a first tool system to be temporarily cooperated with the second UAV and to be used in performing the first task.

Some embodiments access a task predicted power usage database to identify a predicted amount of power to be utilized by each of at least two or more of the multiple UAVs to perform the task. Further, a power level database may be accessed that maintain power level data of each of the multiple UAVs. The evaluation of power level data can include evaluating the power level data indicating a current power level of each of the two or more of the multiple UAVs relative to the predicted amount of power to be utilized. For example, a predicted amount of power can be determined that the second UAV is predicted to utilize to carry the first tool system to perform the first task. The prediction of the amount of power the second UAV is predicted to utilize can include identifying a predicted distance of travel by the second UAV in performing the first task.

Further, some embodiments access predicted power usage by two or more of multiple tool systems to perform the first task, and select the first tool system of the multiple tool systems based at least in part on a power level of the first tool system relative to a tool system threshold power level corresponding to the first task to be performed and a predicted power usage by the first tool system in performing the first task. Some embodiments direct a cooperative operation of each of the multiple UAVs in performing a set of different tasks and rotate the two or more of the multiple UAVs between the different tasks to balance power usage between the multiple UAVs. Power level usage can be evaluated relative to historic power level usage information in evaluating an efficiency of operation of the multiple UAVs. In some implementations, the second UAV can be directed to cause power to be drained from a power source of the first tool system and to be stored in a power source of the second UAV prior to the second UAV disengaging from the first tool system.

Some embodiments provide unmanned aerial task systems and methods of managing tasks through unmanned vehicles. Some systems comprise: multiple unmanned aerial vehicles (UAV) each comprising: a UAV control circuit; a motor; and a propulsion system coupled with the motor and configured to enable the respective UAVs to move themselves; and wherein data acquired through a first set of at least one of the multiple UAVs while performing a first set of at least one task is caused to be distributed to a second set of at least two of the multiple UAVs, and cause cooperative computational processing of the data through the UAV control circuits of the second set of UAVs and cooperatively identify based on the cooperative computational processing a second set of at least one task to be performed, and identify a set of at least two tool systems to be utilized by a third set of at least two of the multiple UAVs in cooperatively performing the second set of at least one task.

Some embodiments, provide methods of performing multiple different tasks through multiple unmanned aerial vehicles (UAV), comprising: causing data, acquired through a first set of at least two multiple UAVs while performing a first set of at least one task, to be distributed to a second set of at least two of the multiple UAVs; causing cooperative computational processing of the data through the UAV control circuits of the second set of UAVs; cooperatively identifying based on the cooperative computational processing a second set of at least one task to be performed; and identifying a set of at least two tool systems to be utilized by a third set of at least two of the multiple UAVs in cooperatively performing the second set of at least one task.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned aerial task system, comprising:
multiple unmanned aerial vehicles (UAV) each comprising:
   a UAV control circuit;
   a motor; and
   a propulsion system coupled with the motor and configured to enable the respective UAVs to move themselves; and
wherein data acquired through a first set of at least one of the multiple UAVs while performing a first set of at least one task is caused to be distributed to a second set of at least two of the multiple UAVs, and cause cooperative computational processing of the data through the UAV control circuits of the second set of UAVs and cooperatively identify based on the cooperative computational processing a second set of at least one task to be performed, and identify a set of at least two tool systems to be utilized by a third set of at least two of the multiple UAVs in cooperatively performing the second set of at least one task.

2. The system of claim 1, wherein a first UAV control circuit of a first UAV is configured to access computational processing capacity information associated with each of the multiple UAVs, and to identify the second set of the at least two UAVs to be utilized in performing the cooperative computational processing based on the computational processing capacity information associated with each of the second set of the at least two UAVs.

3. The system of claim 1, wherein a first UAV control circuit of a first UAV is configured to communicate instructions to a first set of at least one mounting stations directing each of the first set of mounting stations to: access the data acquired through at least the first set of at least one UAV, and further implement cooperatively computational processing of the data along with the UAV control circuits of the second set of UAVs in cooperatively identifying the second set of at least one task to be performed and the set of at least two tool systems.

4. The system of claim 3, wherein the first UAV control circuit is configured to communicate instructions to a central control system directing the central control system to: access the data acquired through at least the first set of at least one UAV, and further implement cooperatively computational processing of the data along with the UAV control circuits of the second set of UAVs and the first set of mounting stations in cooperatively identifying the second set of at least one task to be performed and the set of at least two tool systems.

5. The system of claim 1, wherein a first UAV control circuit of a first UAV is configured to identify at least one UAV in each of multiple geographic areas and communicate instructions, in implementing the cooperative computational processing of the data, to each of the identified at least one UAV in each of multiple geographic areas directing each of the identified at least one UAV in each of multiple geographic areas to perform at least a portion of the cooperative computational processing to identify at least one UAV, of the third set of multiple UAVs, that is associated with the respective one of the multiple geographic areas to be activated in cooperatively performing the second set of at least one task.

6. The system of claim 1, wherein a first UAV control circuit of a first UAV is configured to identify at least one UAV in each of multiple geographic areas and communicate instructions, in implementing the cooperative computational processing of the data, to each of the identified at least one UAV in each of multiple geographic areas directing each of the identified at least one UAV in each of multiple geographic areas to perform at least a portion of the cooperative computational processing to identify at least one tool system, of the set of at least two tool systems, that is associated with the respective one of the multiple geographic areas to be utilized in cooperatively performing the second set of at least one task.

7. The system of claim 6, wherein the UAV control circuit of each of the second set of UAVs is configured to access power level data corresponding to each of multiple other UAVs and select at least one of the third set UAVs to be utilized in cooperatively performing the second set of the at least one task based at least in part on power levels of each of the multiple other UAVs relative to a threshold power level corresponding to at least one of the second set of at least one task.

8. The system of claim 1, wherein a first UAV control circuit of a first UAV is configured to: access a UAV database storing UAV processing capability data defining processing capabilities of each of the multiple UAVs, and select the second set of at least two of the multiple UAVs based on the processing capabilities of each of the second set of at least two UAVs.

9. A method of performing tasks through unmanned aerial vehicles (UAV), comprising:
causing data, acquired through a first set of at least two UAVs while performing a first set of at least one task, to be distributed to a second set of at least two of the multiple UAVs;
causing cooperative computational processing of the data through the UAV control circuits of the second set of UAVs;
cooperatively identifying based on the cooperative computational processing a second set of at least one task to be performed; and
identifying a set of at least two tool systems to be utilized by a third set of at least two of the multiple UAVs in cooperatively performing the second set of at least one task.

10. The method of claim 9, further comprising:
accessing computational processing capacity information associated with each of the multiple UAVs; and
identifying the second set of the at least two UAVs to be utilized in performing the cooperative computational processing based on the computational processing capacity information associated with each of the second set of the at least two UAVs.

11. The method of claim 9, further comprising:
communicating instructions to a first set of at least one mounting stations directing each of the first set of mounting stations to access the data acquired through at least the first set of at least one UAV; and
causing the cooperatively computational processing of the data by the first set of mounting stations along with the UAV control circuits of the second set of UAVs in cooperatively identifying the second set of at least one task to be performed and the set of at least two tool systems.

12. The method of claim 11, further comprising:
communicating instructions to a central control system directing the central control system to access the data acquired through at least the first set of at least one UAV; and
causing the cooperatively computational processing of the data by the central control system along with the UAV control circuits of the second set of UAVs and the first set of mounting stations in cooperatively identifying the second set of at least one task to be performed and the set of at least two tool systems.

13. The method of claim 9, further comprising:
identifying at least one UAV in each of multiple geographic areas;
wherein the causing the cooperative computational processing of the data comprises:
communicating instructions to each of the identified at least one UAV in each of multiple geographic areas directing each of the identified at least one UAV in each of multiple geographic areas to perform at least a portion of the cooperative computational processing to identify at least one UAV, of the third set of multiple UAVs, that is associated with the respective one of the multiple geographic areas to be activated in cooperatively performing the second set of at least one task.

14. The method of claim 9, further comprising:
identifying at least one UAV in each of multiple geographic areas;
wherein the causing the cooperative computational processing of the data comprises:
communicating instructions to each of the identified at least one UAV in each of multiple geographic areas directing each of the identified at least one UAV in each of multiple geographic areas to perform at least a portion of the cooperative computational processing to identify at least one tool system, of the set of at least two tool systems, that is associated with the respective one of the multiple geographic areas to be utilized in cooperatively performing the second set of at least one task.

15. The method of claim 9, wherein the causing the cooperative computational processing comprises:
causing a UAV control circuit of each of the second set of UAVs to access power level data corresponding to each of multiple other UAVs; and
selecting at least one tool system of the set of tool systems and selecting at least one of the third set UAVs to be utilized in cooperatively performing the second set of the at least one task based at least in part on power levels of each of the multiple other UAVs relative to a threshold power level corresponding to at least one of the second set of at least one task.

16. The method of claim 9, further comprising:
accessing a UAV database storing UAV processing capability data defining processing capabilities of each of the multiple UAVs; and
selecting the second set of at least two UAVs based on the processing capabilities of each of the second set of at least two UAVs.

* * * * *